(12) United States Patent
Bentley

(10) Patent No.: US 9,420,322 B2
(45) Date of Patent: Aug. 16, 2016

(54) SYSTEM AND METHOD FOR DELIVERING COMPRESSED APPLICATIONS

(75) Inventor: James Bentley, Colorado Springs, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 664 days.

(21) Appl. No.: 13/419,945

(22) Filed: Mar. 14, 2012

(65) Prior Publication Data

US 2013/0247123 A1 Sep. 19, 2013

(51) Int. Cl.
| | |
|---|---|
| H04N 7/20 | (2006.01) |
| H04N 7/173 | (2011.01) |
| H04N 21/262 | (2011.01) |
| H04N 21/235 | (2011.01) |
| H04N 21/845 | (2011.01) |
| H04N 21/434 | (2011.01) |
| H04N 21/435 | (2011.01) |

(52) U.S. Cl.
CPC ..... *H04N 21/26291* (2013.01); *H04N 21/2353* (2013.01); *H04N 21/4349* (2013.01); *H04N 21/4351* (2013.01); *H04N 21/8458* (2013.01)

(58) Field of Classification Search
CPC ........................ H04N 21/8458; H04N 21/2353
USPC .................................................. 725/71, 109
See application file for complete search history.

(56) References Cited

U.S. PATENT DOCUMENTS

| | | | |
|---|---|---|---|
| 6,957,425 B1 * | 10/2005 | Nadon et al. ................. 717/175 |
| 7,120,786 B2 * | 10/2006 | Miller et al. ..................... 713/1 |
| 8,042,132 B2 * | 10/2011 | Carney et al. ................... 725/37 |
| 2002/0073298 A1 * | 6/2002 | Geiger et al. ................ 711/206 |
| 2003/0056217 A1 | 3/2003 | Brooks |
| 2003/0093653 A1 * | 5/2003 | Oga et al. ....................... 712/220 |
| 2003/0110387 A1 * | 6/2003 | Cowie ..................... G06F 21/53 713/190 |
| 2003/0154471 A1 * | 8/2003 | Teachman et al. ............ 717/171 |
| 2003/0208588 A1 * | 11/2003 | Segal ............................. 709/224 |
| 2007/0022459 A1 | 1/2007 | Gaebel, Jr. |
| 2007/0157209 A1 * | 7/2007 | Hashimoto et al. ........... 718/104 |
| 2007/0217436 A1 | 9/2007 | Markley |
| 2007/0250918 A1 * | 10/2007 | Aboual Chamat ................ 726/5 |
| 2008/0010664 A1 * | 1/2008 | Pelizza et al. .................. 725/134 |
| 2008/0046882 A1 * | 2/2008 | Blackhouse ............ G06F 9/445 717/174 |
| 2008/0086540 A1 * | 4/2008 | Scott et al. .................... 709/217 |
| 2008/0134165 A1 | 6/2008 | Anderson |

(Continued)

OTHER PUBLICATIONS

The Eclipse Foundation open source community website, downloaded from http://www.eclipse.org/ on Jan. 4, 2012.

(Continued)

*Primary Examiner* — Pankaj Kumar
*Assistant Examiner* — Franklin Andramuno
(74) *Attorney, Agent, or Firm* — Otterstedt, Ellenbogen & Kammer, LLP

(57) ABSTRACT

An indication is obtained that consumer premises equipment needs to obtain at least one file from a file system. Responsive to the indication, an uncompressed framework portion of the at least one file is obtained at the consumer premises equipment from the file system. The uncompressed framework portion of the at least one file is executed on the consumer premises equipment to: (i) obtain compressed portions of the at least one file at the consumer premises equipment, from the file system; and (ii) decompress and execute the compressed portions of the at least one file on the consumer premises equipment.

32 Claims, 12 Drawing Sheets

(56) References Cited

U.S. PATENT DOCUMENTS

| | | | |
|---|---|---|---|
| 2010/0226366 A1* | 9/2010 | Lee et al. ............... | 370/389 |
| 2010/0313223 A1 | 12/2010 | Straub | |
| 2010/0313236 A1 | 12/2010 | Straub | |
| 2011/0032420 A1* | 2/2011 | Baek et al. .............. | 348/461 |
| 2011/0063502 A1* | 3/2011 | Legallais et al. ......... | 348/495 |
| 2011/0066671 A1* | 3/2011 | Motohashi ............... | 709/201 |
| 2011/0134763 A1* | 6/2011 | Medina et al. ............ | 370/252 |
| 2011/0310105 A1* | 12/2011 | Koneru et al. ............ | 345/501 |
| 2012/0130808 A1* | 5/2012 | Paz et al. ................. | 705/14.52 |
| 2012/0324212 A1* | 12/2012 | Hiltgen et al. ............ | 713/2 |

OTHER PUBLICATIONS

Knopflerfish Eclipse Plugin, downloaded from http://www.knopflerfish.org/eclipse_plugin.html on Jan. 4, 2012.

OSGi, downloaded from http://en.wikipedia.org/wiki/Osgi on Jan. 5, 2012.

Multimedia Home Platform, downloaded from http://en.wikipedia.org/wiki/Multimedia_home_platform on Jan. 5, 2012.

International Standard, ISO/IEC 13818-6,First edition Sep. 1, 1998,Amendment 1 Oct. 15, 2000.

"Digital Video Broadcasting (DVB);Multimedia Home Platform (MHP) Specification 1.2" EBU UER, Digital Video Broadcasting, DVB Document A107 2007 p. 1-66.

"GEM 1.2 (including IPTV)" Digital Video Broadcasting, DVB Document A108 May 2007.

Frank Buschmann, et al. "Pattern-Oriented Software Architecture," The essence of modern software engineering, OOP 2008, Jan. 21-25, 2008, Munich, Germany.

Information technology—Generic coding of moving pictures and associated audio information—Part 6: Extensions for DSM-CC, International Standard ISO/IEC 13818-6, Sep. 1998.

"OpenCable Application Platform Specifications" OCAP 1.1 Profile OC-SP-OCAP1.1.3-100603, 2001-2010 Cable Television Lab., Inc.

"JDT Programmer's Guide", OTI , IBM Corporation and others 2000, 2005.

OSGi Service Platform Core Specification The OSGi Alliance Release 4, Version 4.2, Jun. 2009.

DSM CC, downloaded from http://en.wikipedia.org/wiki/DSM_CC on Feb. 16, 2012.

Data and object Carousel, downloaded from http://en.wikipedia.org/wiki/Data_and_object_carousel on Feb. 16, 2012.

DOCSIS, downloaded from http://en.wikipedia.org/wiki/Docsis on Feb. 15, 2012.

Telnet Protocol Specification RFC 854, IETF, May 1983.

Design pattern, downloaded from http://en.wikipedia.org/wiki/Design_patterns on Feb. 15, 2012.

Mediator pattern, downloa from http://en.wikipedia.org/wiki/Mediator_pattern on Feb. 15, 2012.

"TV Without Borders, An Introduction To Xlets" downloaded from http://www.mhp-interactive.org/tutorials/javatv/xlet_intro on Feb. 15, 2012.

Digital Video Broadcasting (DVB) Multimedia Home Platform (MHP) Spec 1.2.2, DVB Document A140, Jun. 2009.

* cited by examiner

```
<jar basedir="${dir.output}/classes/showlist"
destfile="${dir.output}/classes/showlist/showlist.jar"
includes="com/**,resources/**"
excludes="resrources/*.bls" />
```

FIG. 14

```
Manifest-Version: 1.0
Main-Class: com.twc.ocapx.cpc.impI.CPCXlet
Bundle-Vendor: TWC
Bundle-Version: 1.0.0
Bundle-Name: ContentPresentation
Bundle-ManifestVersion: 2
Bundle-SymbolicName: ContentPresentation
Launch-Priority: 2
Import-Package: com.twc.ocap.util.data, com.twc.ocap.util.hardware,
com.twc.ocap.util.sort, com.twc.ocapx, com.twc.ocapx.binlog, javax.media,
javax.tv.servIce, javax.tv.service.navigation, javax.tv.service.selection,
javax.tv.xlet, org.davic.net.tuning, org.dvb.media, org.dvb.
user, org.havi.ui, org.ocap.dvr, org.ocap.media, org.ocap.net, org.oc
ap.shared.dvr, org.ocap.shared.dvr.navigation, org.ocap.system
Export-Package: com.twc.ocapx.cpc
```

FIG. 15

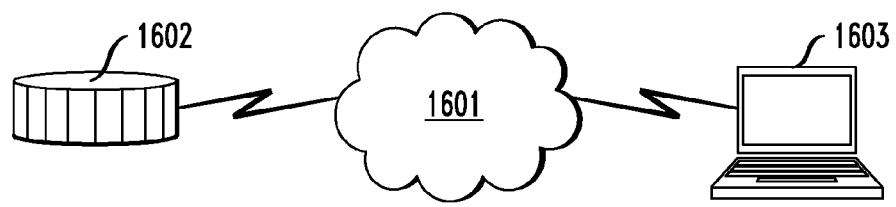

FIG. 16

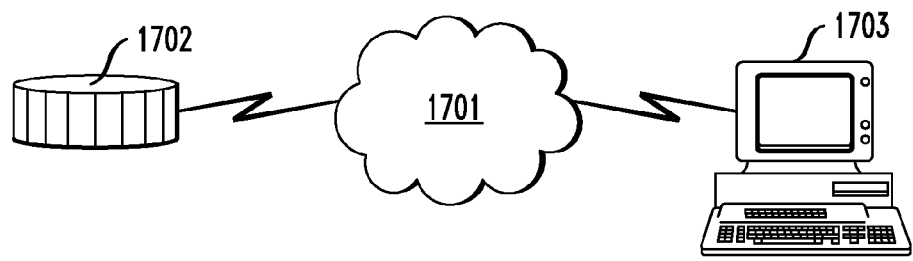

SYSTEM AND METHOD FOR DELIVERING COMPRESSED APPLICATIONS

FIELD OF THE INVENTION

The present invention relates generally to communications networks, such as video content networks, and, more particularly, to provisioning techniques for such networks and the like.

BACKGROUND OF THE INVENTION

Provisioning is the process of preparing and equipping a communications network to allow it to provide services to its users. In a video content network, consumer premises equipment (CPE), such as set-top terminals (STTs, also referred to as set-top boxes or STBs), is provisioned by downloading applications and the like from an upstream node; for example, a head end. Some systems employ the OpenCable Application Platform, or OCAP, which is an operating system layer designed for consumer electronics that connect to a cable television system. Digital storage media command and control (DSM-CC) is a toolkit for developing control channels associated with MPEG-1 and MPEG-2 streams.

OCAP uses a DSM-CC Object Carousel (OC) to deliver applications to a set top box. The OC is a virtual file system. It defines path like structures to individual files. OCAP leverages this specification to construct application locators (in Universal Resource Locator—URL—form). A compressed file, specifically a Java Archive (JAR), is also a virtual file system. Compressed file data is represented as entries within the JAR. The URL and carousel descriptors do not support indexing within a file. As such, applications must exist, on the OC, in un-compressed form.

SUMMARY OF THE INVENTION

Principles of the present invention provide a system and method for delivering compressed applications. In one aspect, an exemplary method includes the step of obtaining, at consumer premises equipment, from a file system, an indication that the consumer premises equipment needs to obtain at least one file from the file system. A further step includes, responsive to the consumer premises equipment obtaining the indication, obtaining, at the consumer premises equipment, from the file system, an uncompressed framework portion of the at least one file. A further step includes executing the uncompressed framework portion of the at least one file on the consumer premises equipment to: (i) obtain compressed portions of the at least one file at the consumer premises equipment, from the file system; and (ii) decompress and execute the compressed portions of the at least one file on the file system.

In another aspect, exemplary consumer premises equipment includes at least one hardware processor; and at least one memory coupled to the at least one processor. The at least one processor is operative to carry out or otherwise facilitate any one, some, or all of the method steps described herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments of the invention allow for a larger number of applications and or resources to be delivered to a set top box utilizing less network bandwidth. One or more embodiments of the invention enable applications to be updated without requiring the set top box to be rebooted. Further, one or more embodiments of the invention allow the set top box to store, locally, more data and applications. One or more embodiments of the invention provide a significantly improved technique for delivering and managing applications that are executed on a set top box.

These and other features and advantages of the present invention will become apparent from the following detailed description of illustrative embodiments thereof, which is to be read in connection with the accompanying drawings.

BRIEF DESCRIPTION OF THE DRAWINGS

FIG. 14 shows an exemplary bundle's manifest file, according to an aspect of the invention;

FIG. 15 shows an exemplary cellular-based system, according to an aspect of the invention; and FIG. 16 shows an exemplary internet protocol-based system, according to an aspect of the invention.

DETAILED DESCRIPTION OF PREFERRED EMBODIMENTS

Embodiments of the invention may be implemented in a variety of contexts. Purely by way of example and not limitation, some embodiments will be shown in the context of a cable multi-service operator (MSO). Another embodiment will be shown in the context of a satellite system.

Figure 1:
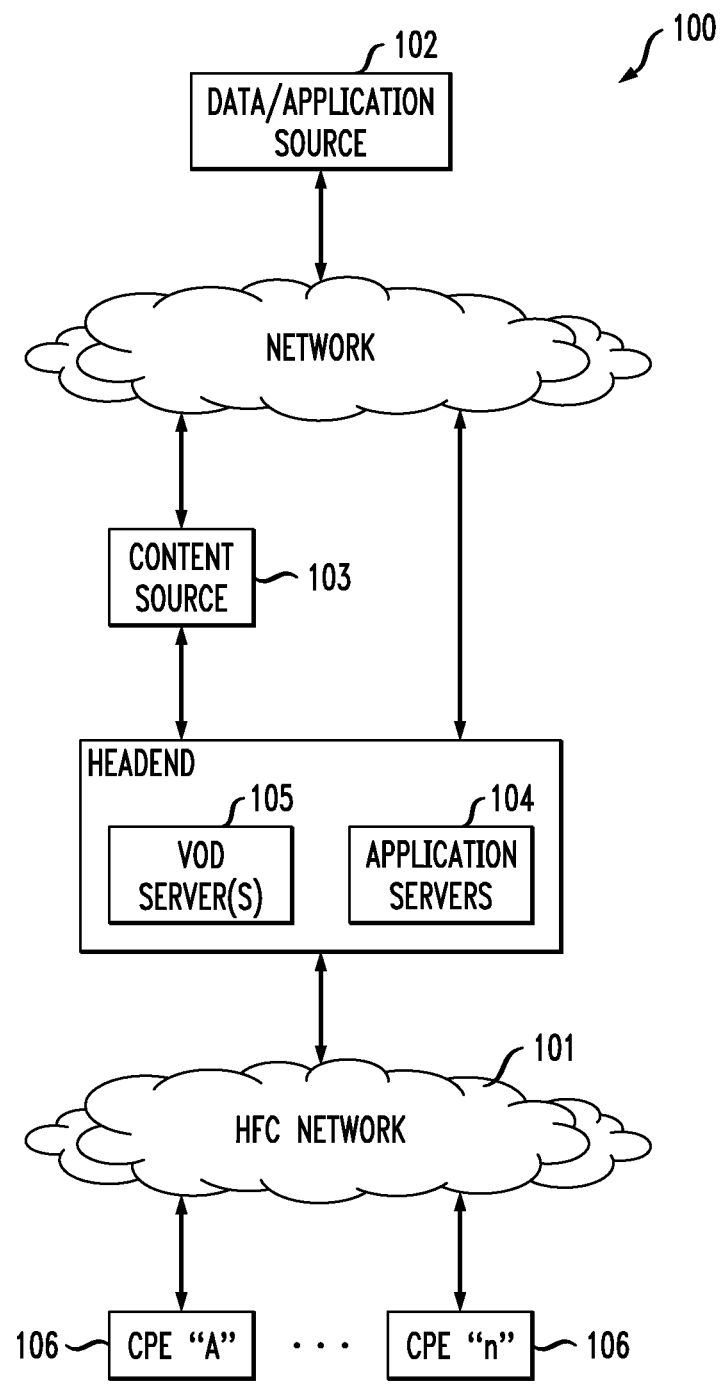
FIG. 1 is a functional block diagram illustrating an exemplary hybrid fiber-coaxial (HFC) network configuration useful with one or more embodiments of the present invention.

Initially, the complete disclosure of United States Patent Application Publication 2008/0134165 of Anderson et al. entitled "Methods and apparatus for software provisioning of a network device," published on Jun. 5, 2008, is expressly incorporated herein by reference in its entirety for all purposes. FIG. 1 illustrates a typical content-based network configuration 100 with which techniques of the present invention may be used. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) 106. The distribution server(s) 104, VOD servers 105 and CPE(s) 106 are connected via a bearer (e.g., HFC) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 2 (described in greater detail below) may be used.

It should be noted at this point that in addition to a conventional HFC network or a switched digital network to be discussed below, other kinds of video content networks can be employed for network 101 (e.g., satellite network of FIG. 10, fiber-to-the-home (FTTH) or fiber-to-the-curb (FTTC)).

The data/application origination point 102 comprises any medium that allows data and/or applications (such as a VOD-based or "Watch TV" application) to be transferred to a distribution server 104. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104.

Figure 2:
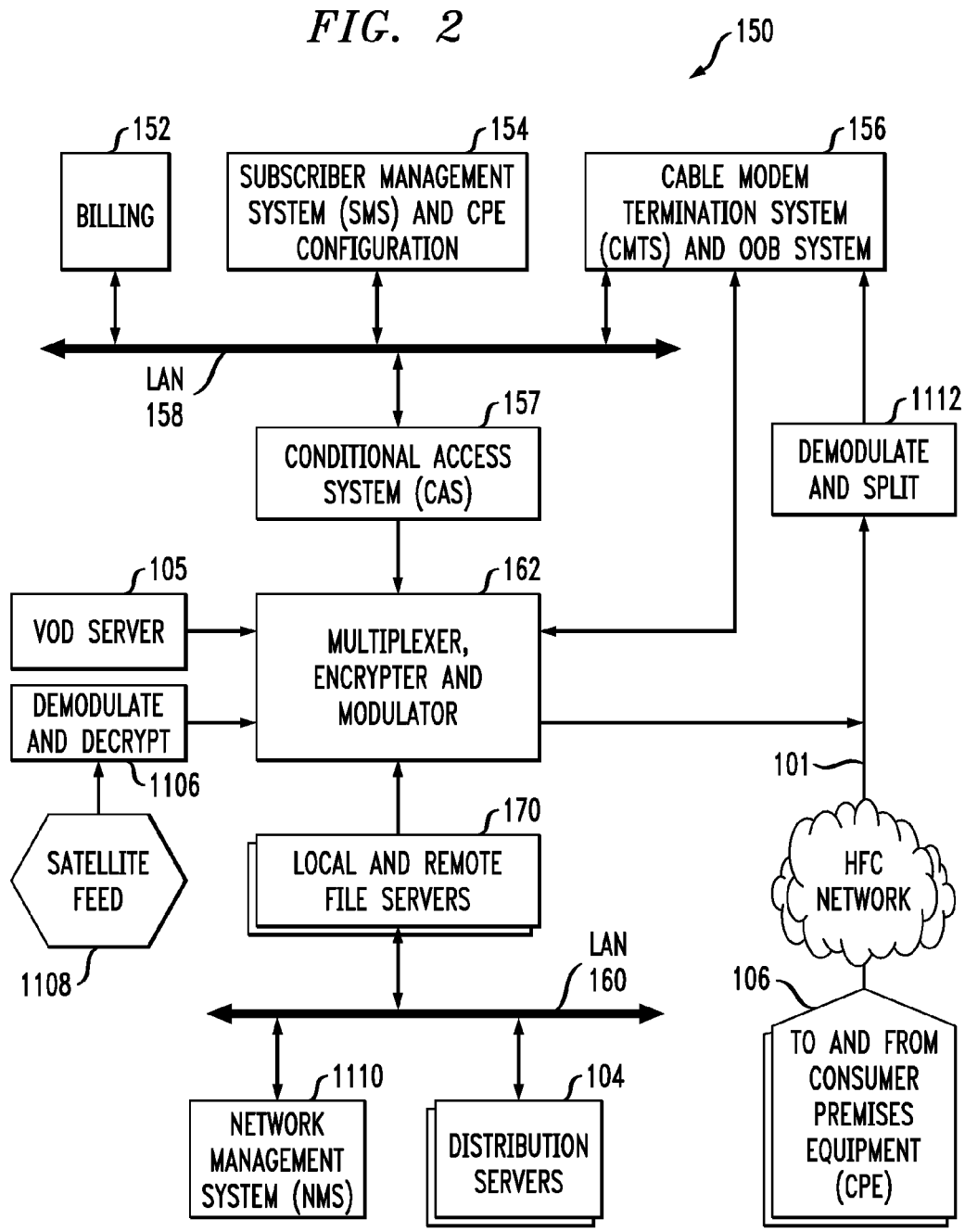
FIG. 2 is a functional block diagram illustrating one exemplary HFC cable network head-end configuration useful with one or more embodiments of the present invention.

Referring now to FIG. 2, one exemplary embodiment of a head-end architecture useful with the present invention is described. As shown in FIG. 2, the head-end architecture 150 comprises typical head-end components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 2 is high-level, conceptual architecture and that each multi-service operator or multiple system operator (MSO) may have multiple head-ends deployed using custom architectures.

The architecture 150 of FIG. 2 further includes a multi-plexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 3) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without ® the symbol, for convenience. The Open-Cable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. The DOCSIS Set-top Gateway (DSG) Interface Specification, CM-SP-DSG-119-111117, and the OpenCable™ Application Platform Specifications, OpenCable Application Platform (OCAP), OC-SP-OCAP1.2-110512, both available from the aforementioned Cable Television Laboratories, Inc., are expressly incorporated herein by reference in their entireties for all purposes. Furthermore, the DAVIC 1.0 through 1.5 specifications, inclusive, available from DAVIC, the Digital Audio Video Council, are also expressly incorporated herein by reference in their entireties for all purposes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Figure 3:
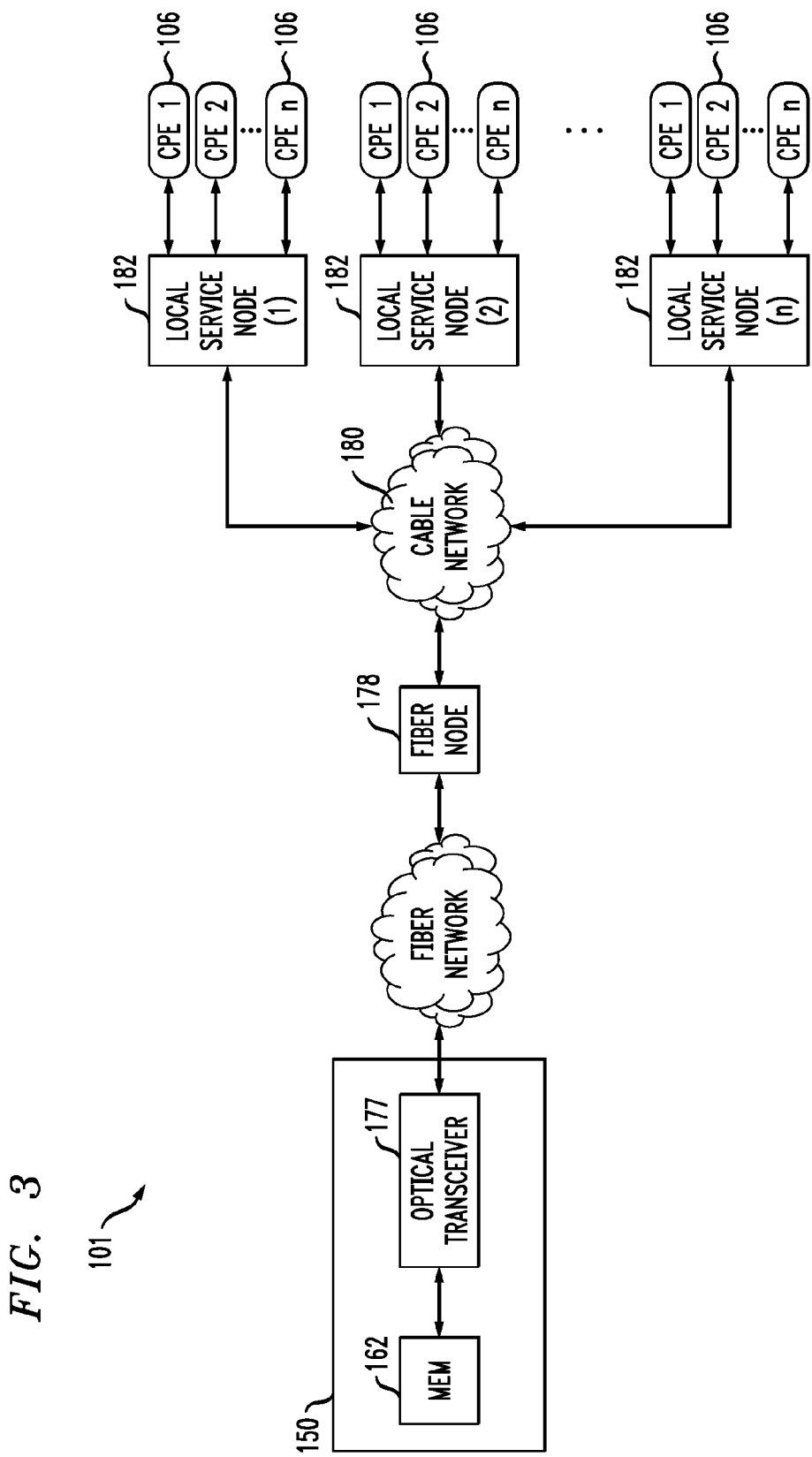
FIG. 3 is a functional block diagram illustrating one exemplary local service node configuration useful with one or more embodiments of the present invention.

As shown in FIG. 3, the network 101 of FIGS. 1 and 2 comprises a fiber/coax arrangement wherein the output of the MEM 162 of FIG. 2 is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

Figure 4:
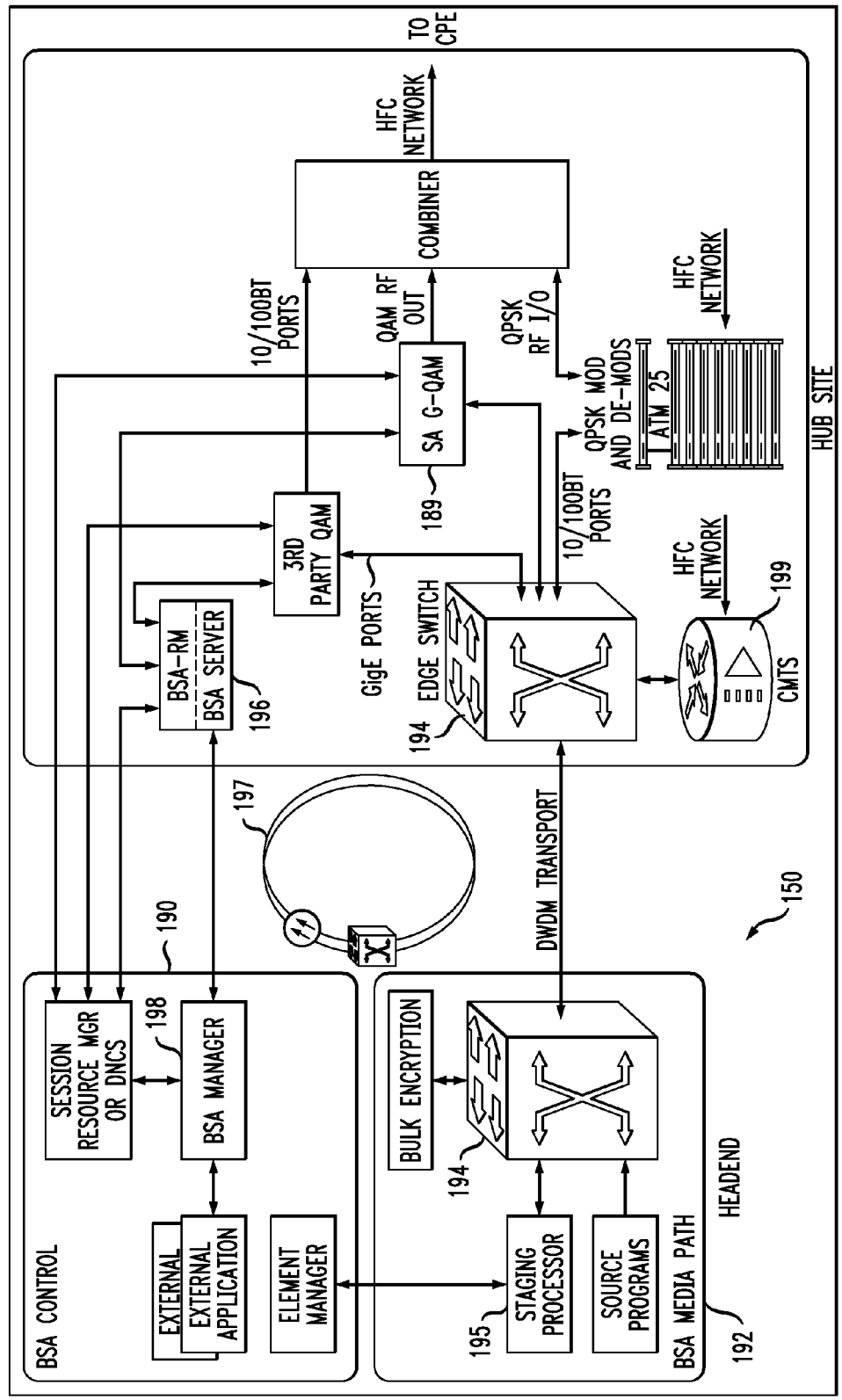
FIG. 4 is a functional block diagram illustrating one exemplary broadcast switched architecture (BSA) network useful with one or more embodiments of the present invention.

FIG. 4 illustrates an exemplary "switched" network architecture also useful with one or more embodiments of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 4 shows the implementation details of one exemplary embodiment of this broadcast switched network architecture. Specifically, the head-end 150 contains switched broadcast control and media path functions 190, 192 (the latter including staging processor 195); these elements cooperate to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture useful with one or more embodiments of the present invention, although it will be recognized by those of ordinary skill that other approaches and architectures may be substituted.

In addition to "broadcast" content (e.g., video programming), the systems of FIGS. 1-4 may also deliver Internet data services using the Internet Protocol (IP), although other protocols and transport mechanisms of the type well known in the digital communication art may be substituted. One exemplary delivery paradigm comprises delivering MPEG-based video content, with the video transported to user personal computers (PCs) (or IP-based set-top boxes (STBs)) over DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream quadrature amplitude modulation (QAM) channels (QAMs) to the tuner of the user's STB or other receiver device for viewing on the television, and also as packetized IP data over the DOCSIS QAMs to the user's PC or other IP-enabled device via the user's cable modem.

Referring again to FIG. 4, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component. Note also that edge switch 194 in block 150 in FIG. 4 can, in the most general case, be the same or different as that shown in the hub site of FIG. 4. Also, in other embodiments, CMTS 199 could be located in a place other than the hub site.

The edge switch 194 forwards the packets received from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while some examples presented herein are described in the context of Internet services that include multicast and unicast data, other examples could involve other types of services that include multicast transmission of data delivered over a network having multiple physical channels or even virtual or logical channels. For example, switching between various physical channels that comprise a virtual channel, can itself be conducted according to the "switched" approach. As a simple illustration, if a first virtual channel is comprised of physical channels (e.g., QAMs) A, B and D, and a second virtual channel is comprised of QAMs C, E and F, a cable modem (CM) or other CPE can be configured to switch between the A/B/D and C/E/F virtual channels as if they were a single QAM.

The configurations shown in FIGS. 1-4 are exemplary in nature and different approaches may be used in other embodiments; such other approaches may have more or less functionality (for example, high speed Internet data services might be omitted in some cases).

Figure 5:
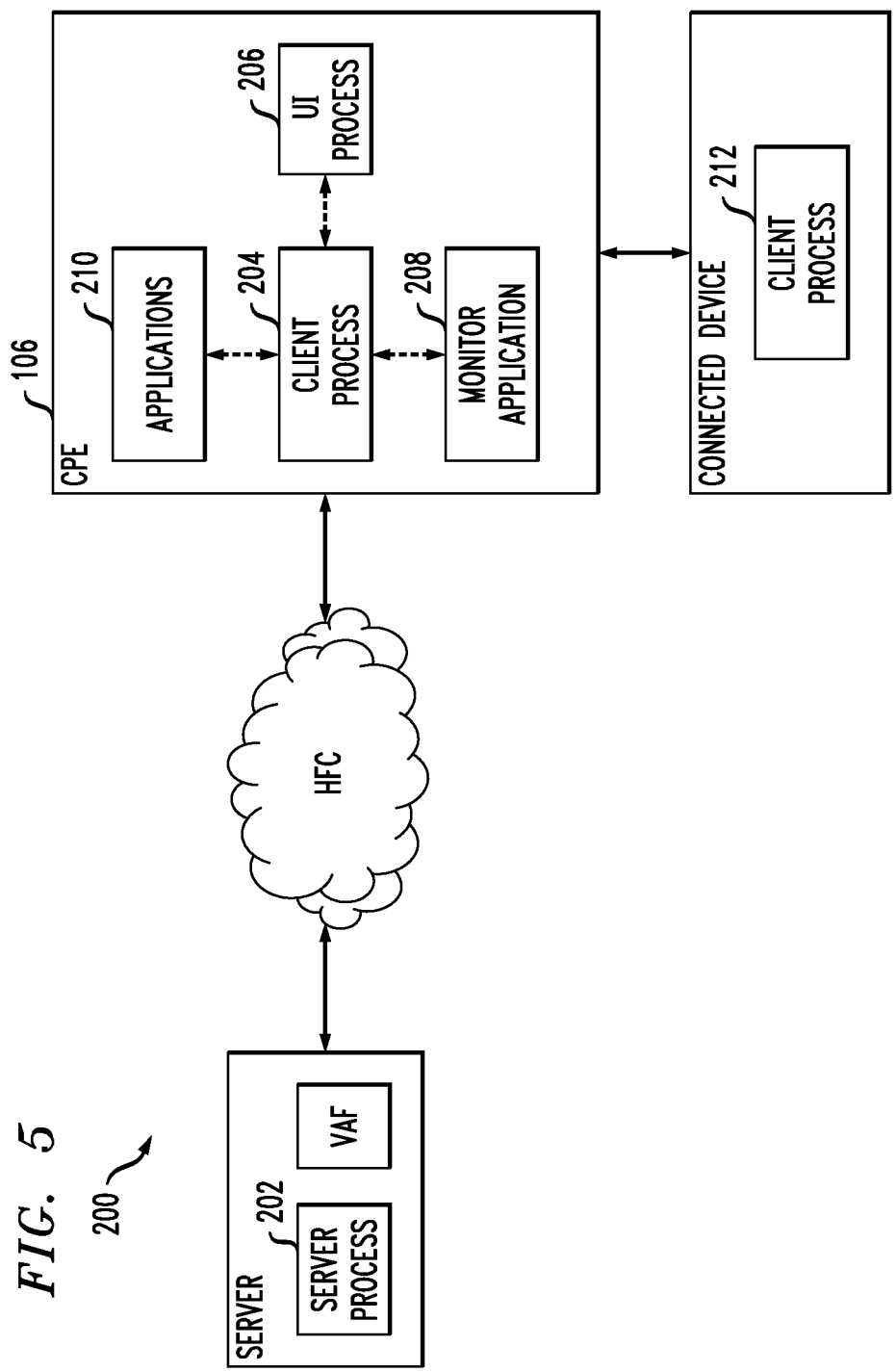
FIG. 5 is a functional block diagram depicting an illustrative software provisioning architecture in which techniques of the present invention may be used.

FIG. 5 illustrates one exemplary embodiment of a generalized software provisioning architecture. As shown in FIG. 5, the architecture 200 includes a "server" process 202, which may be disposed for example on a server or other device at the head-end 150 of the network, at a BSA switching hub (see FIG. 4), or yet other location as desired. The server functionality may be integrated with one or more other existing components (e.g., an application server 104 as shown in FIG. 1). By disposing the server process 202 at the head-end, BSA hub, or some other node with connectivity to multiple CPE, the server process can advantageously service and provision multiple CPEs 106 simultaneously.

The "server" functionality may be provided by a number of existing components and/or processes already in place within the network, such as for example use of existing messaging facilities to generate and deliver the update messages, the use of a carousel function to select and download applications or other components, and so forth. Each of the foregoing features is described in greater detail subsequently herein.

As shown in FIG. 5, a corresponding client process 204 is disposed on each CPE 106 (or a selected subset of all CPE); this process allows the CPE 106 to receive/send information from/to the server process 202, for e.g., determining the need for provisioning, remote configuration and provisioning of the CPE 106, monitoring of operations, statistics, status information, and the like.

The client portion 204 may also be in logical communication with other processes within the CPE, such as for example an OCAP-compliant monitor application or middleware 208, a user interface (and configuration) process 206, other applications 210 running on the CPE, and the like. Client processes 212 on other devices, such as a device coupled to the CPE 106 via a wireless or networking interface, can also communicate with the client process 204 if desired.

The CPE 106 may also include various other processes, such as a media server, web or http server, and so forth. These can be used in a stand-alone fashion (e.g., where a personal media device (PMD) in the premises network merely accesses the media server in order to obtain stored personal content from the CPE 106), or as a local proxy for other distant servers (such as a remote third party web server, and the like). Moreover, the CPE may take any number of forms, including for example a set-top box (e.g., DSTB); a converged device or "hive" as disclosed in US Patent Publication 2007/0217436 of Markley et al, entitled "Methods and apparatus for centralized content and data delivery," the complete disclosure of which is expressly incorporated herein by reference in its entirety for all purposes; a wireless satellite receiver; or the like. All of the foregoing aspects are non-limiting examples of optional extra functionality. One or more embodiments are generally applicable to OCAP (over US or Korean cable, e.g.) or Multimedia Home Platform (MHP) (over satellite, e.g.) television terminals. The DVB Project's Digital Video Broadcasting (DVB) Multimedia Home Platform (MHP) Specification 1.2 is expressly incorporated herein by reference in its entirety for all purposes, as are all other versions of same.

Figure 6:
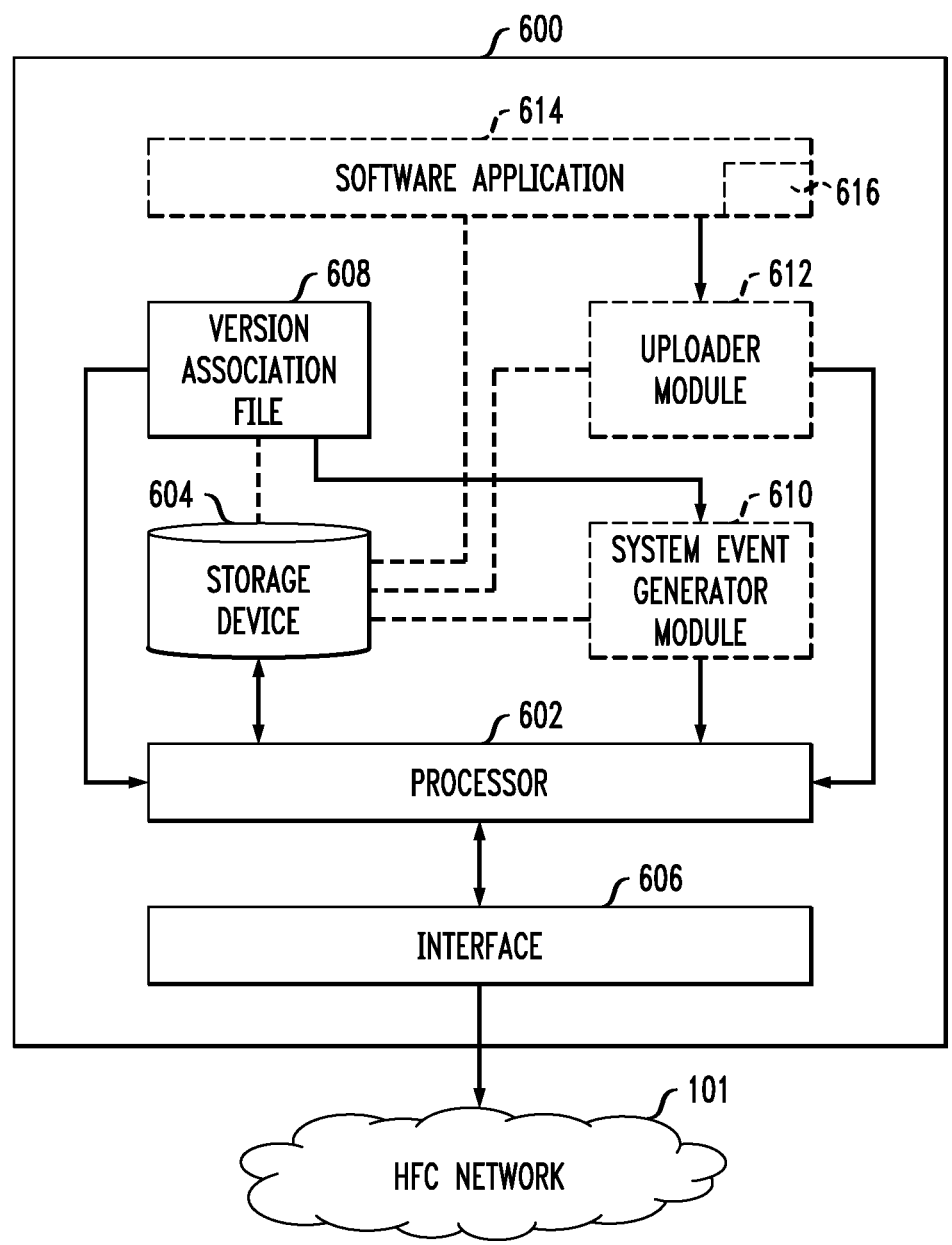
FIG. 6 is a functional block diagram of a server configured to provision CPE software.

FIG. 6 is a functional block diagram of an exemplary server 600 configured to transmit a software application 614 or other component to a CPE 106. A processor 602 resident on the server 600 is in data communication with a network interface 606 and a storage device 604. The storage device 604 comprises a non-volatile memory device such as a hard disk that is electrically coupled to the processor 602. Resident on the Storage Device 604 is a Version Association File (VAF) 608 or other comparable data structure that maps an application version 616 of a given software application 614 to a range of addresses corresponding to those CPE 106 that have been designated for that application version 616.

A system event generator module 610 is also present on the storage device 604. The system event generator module 610 may broadcast a DSM-CC catalog update message over the HFC Network 101 upon a modification to the Version Association File 608. The DSM-CC Catalog Update message may be transmitted to the CPE 106 along with the Version Association File 608 (or the two may be sent independently but in a contemporaneous fashion). In other instances, only the DSM-CC catalog update message is sent to the CPE 106 upon a modification to the Version Association File 608. Of course, the invention is not limited to DSM-CC messages. For example, as an alternative (or in addition) to a DSM-CC message, an IP message can be used.

The software application 614 is present on the storage device 604 of the server, along with an uploader module 612 that is used to broadcast the application version 616 of the software application 614 over the HFC network 101. The CPE 106 downloads the application version 616 of the software application 614 if that CPE has been designated in the Version Association File 608 (for example, by address, MAC, TUNER ID, TUNER USE, opaque variable, etc.) and the application version 616 of the software application 614 is not already present on the CPE 106. US Patent Publication 2007/0022459 of Gaebel et al., entitled "Method and apparatus for boundary-based network operation," the complete disclosure of which is expressly incorporated herein by reference in its entirety for all purposes, describes exemplary approaches for implementing TUNER USE, TUNER ID, and opaque variables.

In one variant, the Version Association File 608 contains at least six fields: (i) an ORG ID, (ii) an App ID, (iii) an App Type, (iv) a Launch Order, (v) a Target Type, and (v) Targets. These fields are described in the aforementioned Anderson et al. publication 2008/0134165.

Figure 7:
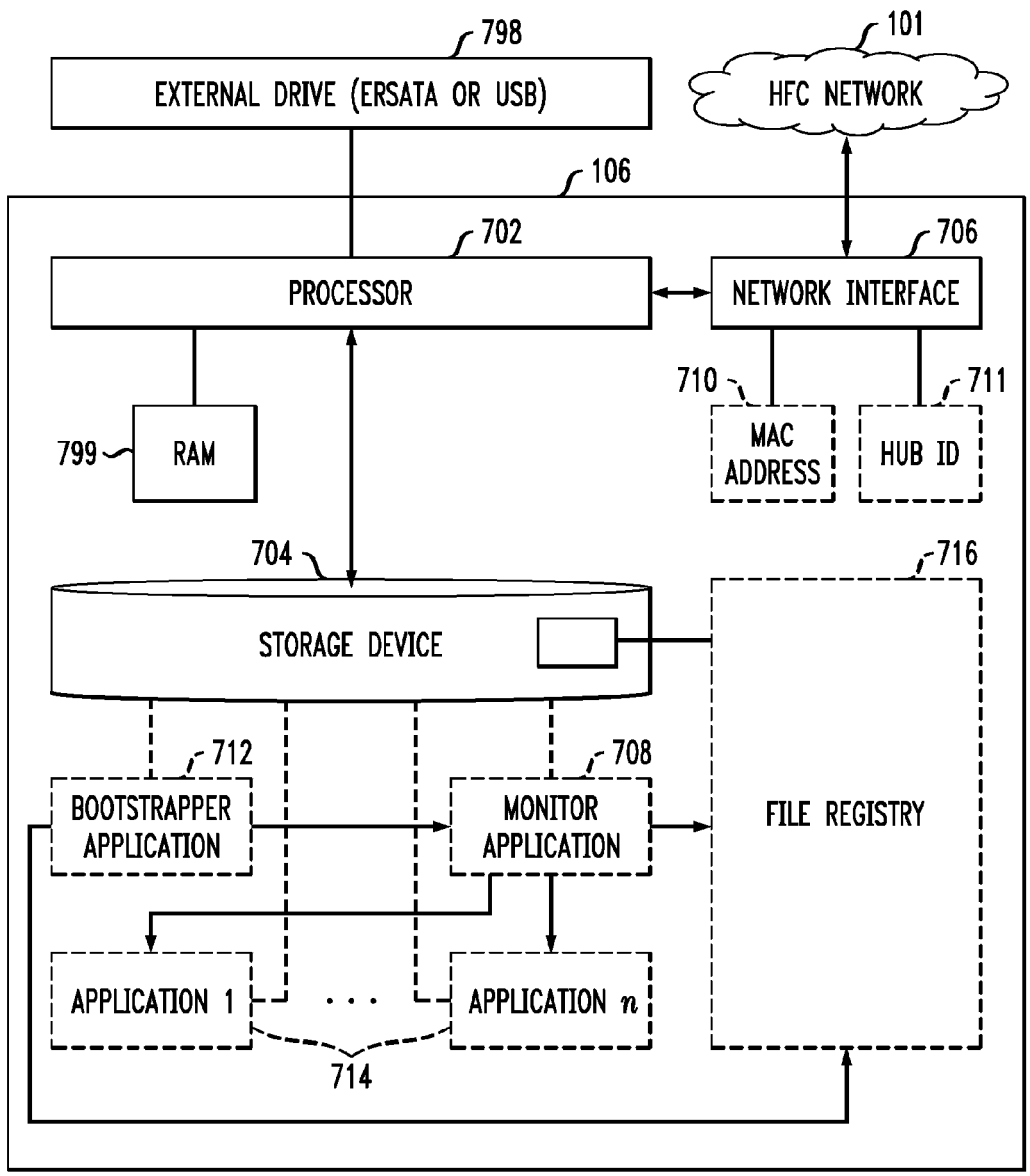
FIG. 7 is a functional block diagram depicting exemplary customer premises equipment.

FIG. 7 illustrates a functional block diagram of an exemplary CPE 106 configured to implement the download and provisioning methods. As shown in FIG. 7, a processor 702 resident on the CPE 106 is in data communication with the network interface 706 and a storage device 704. The processor 702 is used to execute instructions such as those instructions used in communicating with the network interface 706 and those instructions used for loading and storing data to the storage device 704, as is well known in the electronic arts. The network interface 706 manages data transmitted and received over, e.g., the HFC Network 101, and comprises the MAC Address 710 and the Hub ID 711. Depending on the network topology and delivery mechanism used, the interface 706 may comprise any number of different modalities including without limitation a radio frequency tuner stage (and demultiplexer (demux)) of the type well known in the art, a Data Over Cable Service Interface Specification (DOCSIS) or other cable modem, an IP interface, 802.3 Ethernet interface, 802.11 WiFi interface, and so forth. Embodiments of the invention are, in general, not limited to any particular type of network. The data, applications, or content received by the CPE 106 via the interface is stored on the storage device 704.

In one embodiment, the storage device 704 is a non-volatile memory device such as a hard disk that is in data communication with the processor 702. Resident on the storage device 704 is a bootstrap application 712, a monitor application 708, a file registry 716, and optionally, one or more of the application versions 616 of one or more software applications 614, 714 previously described. The exemplary file registry 716 is a table of numeric entries assigned to each of the application versions 616 of each of the software applications 614, 714 currently installed in the CPE or connected devices. The aforementioned Anderson et al. Publication 2008/0134165 describes a bootstrap application 712 and monitor application

708. Applications on device 704 may be loaded into RAM 799 to configure the processor 702 to implement appropriate functionality.

OCAP uses a DSM-CC Object Carousel (OC) to deliver applications to a set top box. The OC is a virtual file system. It defines path like structures to individual files. OCAP leverages this specification to construct application locators (in Universal Resource Locator—URL—form).

A compressed file, specifically a Java Archive (JAR), is also a virtual file system. Compressed file data is represented as entries within the JAR.

The URL and carousel descriptors do not support indexing within a file. As such, applications must exist, on the OC, in un-compressed form.

As application development continues, the size of the application becomes larger. The existing OC implementations are limited in the amount of bandwidth available to each carousel.

Advantageously, one or more embodiments advantageously provide the capability to deliver applications, on an OC, in compressed form. Indeed, one or more embodiments advantageously provide a system and/or method for delivering compressed applications on a DSM-CC object carousel.

In one or more embodiments, a small portion of the application, known as the framework, exists on the OC in uncompressed form. The remainder of the application is populated, on the OC, in one or more compressed JAR files.

The framework is responsible for loading and initializing the JAR file(s) necessary to execute the application.

The framework is signaled as the application to launch. The OCAP system then reads this application and launches the framework. The framework then consults a list of JAR files available to load. The framework interrogates the set-top box (e.g., OCAP device or MHP terminal) to determine system capabilities. Based on this information, the framework decides which JAR files should be loaded.

The framework loads, and decompresses, each JAR file, that can be supported by the OCAP device/ and/or is available to the OCAP device, into memory. A manifest file, within each, JAR file, is examined when the JAR file is loaded. The manifest is used to identify JAR initialization classes as well as dependencies. If the dependencies can be met, the framework uses a Java ClassLoader to make classes, defined in the JAR file, available for use. Once the classes are loaded, via the ClassLoader, the framework will instantiate the class, designated in the manifest file, and execute it.

Currently, the DSM-CC OC specification defines a method of Object Carousel Compression. This method compresses the entire carousel. Unfortunately, the receiving device must then decompress the OC in order to read the carousel's contents and execute signaled applications. There is currently no way to compress only portions of the carousel file system. This takes both time and memory on the set top box. Consider the compressed module descriptor. Data carousel modules may be compressed to save space in the transport stream. This descriptor indicates that the module has been compressed using the 'zlib' compression scheme. Since this descriptor only refers to modules, it can only be carried in the DII ModuleInfo. With regard to the above reference DII (MPEG) descriptor; this compresses the module in the MPEG stream—the entire carousel.

Since the carousel is decompressed, by the OCAP device, the applications, contained on the OC, will currently be stored in an un-compressed form. However, one or more embodiments ensure that applications are stored, on the OCAP device, in compressed form. Application storage is a finite resource. When applications are stored in compressed form, more storage space is available for the storage of other applications as well as the growth of the product. Note that one or more embodiments allow for correct operation even if the OC is compressed. The prior passage simply points out an alternate, yet inferior, way to deliver compressed applications to a set top box.

Currently, the OCAP/MHP system allows for loading applications via HTTP. The URLs specified in this operation do support indexing in JAR files. However, the HTTP file system requires two-way communications between the HTTP server and the OCAP device. These communications are typically cumbersome in non-DSG (DOCSIS Set top Gateway) mode—typically referred to as DAVIC two-way communications. As such, the population of devices, that can effectively use HTTP loading, is dramatically constrained. Applications, retrieved via HTTP, are typically decompressed by the OCAP device. As such, the applications may currently be stored, on the OCAP device, in an un-compressed form. However, one or more embodiments ensure that applications are stored, on the OCAP device, in compressed form.

One or more embodiments are compatible with HTTP deployments.

Figure 8:
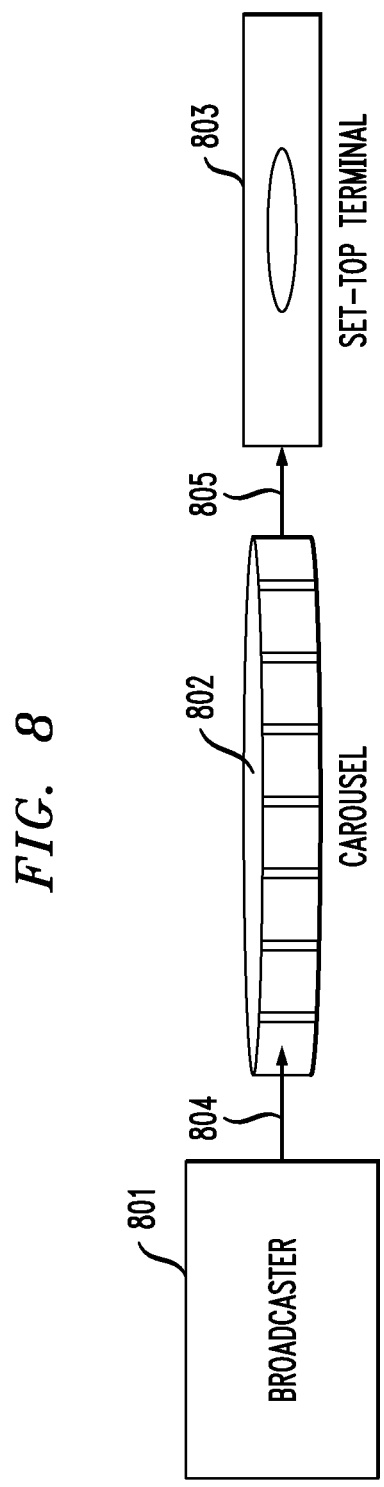
FIG. 8 is a block diagram of an exemplary system, in accordance with an aspect of the invention.

Referring now to FIG. 8, Transport Stream Broadcaster (TS Broadcaster) 801 is responsible for generating the Object Carousel, and populating it with files. Digital Streaming Media Command and Control Object Carousel (DSM-CC OC) 802 includes a virtual file system delivered in a television MPEG stream. Digital Set Top Box 803 (an example of CPE 106) includes a receiver for television digital media including the DSM-CC OC. As seen at 804, files are added to the DSM-CC OC 802 by the TS Broadcaster 801. As seen at 805, the files are received by the Digital Set Top Box and interpreted.

OCAP specifies how to interpret special files on the DSM-CC OC. This includes applications that are to be executed on the set top box. One such application is the 'framework' application. The Digital set top box reads the 'framework' application from the DSM-CC OC and executes it, on the set top box hardware.

The 'framework', when executed, reads files from the DSM-CC OC. A number of these files are compressed sets of executable applications and libraries. The framework identifies these special files and: (1) decompresses them to memory on the set top box, (2) interprets the contents of the decompressed files, and (3) executes applications defined within the decompressed files.

Once the framework is executing on the set top box, the framework is free to load and interpret files from the DSM-CC OC and/or any other connected and/or accessible file repository. These repositories include files accessible via Hyper-text Transfer Protocol (HTTP), file transfer protocol (FTP), local disk storage and/or local memory.

Numerous applications exist for the OCAP environment. One or more embodiments allow these applications to be made available, in compressed form, on a DSM-CC OC. One or more embodiments relate to delivering applications, in compressed form, to an OCAP set top box. On the other hand, one or more embodiments relate to adapting existing OCAP applications so that they can be deployed, in compressed form, to an OCAP set top box.

It is beneficial to not have to re-compile many of the applications; for example, because they are end-of-life or no longer supported for development. One or more embodiments provide a method for re-packaging OCAP applications to enable delivery, of the application, in a compressed form, on a DSM-CC Object Carousel. Such method is a simplification of the aspect wherein an application is repackaged such that it can be deployed, in compressed form, on an OC. Again, some embodiments provide techniques for delivering applications in compressed form on a DSM-CC OC. Other embodiments provide techniques for converting existing applications—those specifically built to be delivered on a DSM-CC OC in decompressed form—into an application that can be delivered in compressed form.

In one or more embodiments, a small class (BundleXlet) is defined that assumes the role of the initial Xlet for the repackaged application. The original application (OA) is compressed, along with its associated permissions and configuration files, into a Java Archive (JAR) file. The JAR file is then deployed, on the OC, along with the BundleXlet. The OCAP launch configuration, or Application Descriptor, includes all of the specified command line arguments signaled for the OA. However, the Application Descriptor is modified such that the BundleXlet is the class launched.

Upon execution, the BundleXlet makes the contents, of its associated JAR file, available to other applications.

The framework, from the embodiments that provide techniques for delivering applications in compressed form on a DSM-CC OC, understands how to identify and communicate with the BundleXlet. The framework acquires the OA from the BundleXlet. The framework then establishes an XletContext for the OA. This XletContext provides access to the command line arguments, and other properties, defined in the Application Descriptor. The OA is then decompressed into memory. The framework uses a Java Class Loader to load the classes defined in the OA JAR file. The framework then identifies the OA's main class, which was replaced, in the Application Descriptor, by the BundleXlet; instantiates it, and executes it.

One or more embodiments advantageously provide a system for dynamically modifying features of an OCAP application. As used herein, "AIT" means "Application Information Table" and "XAIT" means "Extended Application Information Table." OCAP applications have to be signaled for execution in an application descriptor file, the AIT/XAIT. The OCAP device will reboot, or request a reboot, if the version of an application changes. As such, it is necessary to reset the OCAP device when an application changes.

One or more embodiments provide a system wherein features of an application are dynamically loaded, and bound to one another, when the application is executed. This also allows the features to be un-loaded, un-bound to one another, during the application's execution. As such, individual features can be replaced, while an application is executing, without requiring the device to reboot.

Unfortunately, OCAP devices frequently cache the OC in an attempt to increase OC READ performance. As such, changes on the OC may not be recognized unless the AIT/XAIT changes. For this reason, it is desirable to allow features to be acquired from various alternate locations.

Further, deployment from alternative locations enables acquisition of applications and/or features from non-OCAP environments, such as a generic HTTP server. Deploying applications from an HTTP server allows for a centralized deployment model which significantly reduces deployment costs. Potentially, this deployment model may be employed to offer subscription or other purchasable features and/or applications. For example, a so-called "app store" might be provided wherein subscribers can purchase applications (e.g., video gaming applications) that will run on the set-top box without having to re-boot the device.

Feature management can be broken into two parts. The first part deals with the initial loading of the features. The second part deals with run-time enabling, disabling, adding or replacing features.

When the application is started, it examines a list of features that are available to it. The feature information, contained in the feature list, may include any system dependencies and/or alternate location(s) for the feature code and resources. The application can then load the features that are appropriate for the device (based on system dependencies).

When a feature is loaded, it advertises its services in a common application registry. The feature may also resolve any services it requires from the application registry. Given the dynamic nature of the system, if a feature resolves services, the feature should also listen for changes in the registry.

The registry will notify listeners if services are added or removed. When services are removed, consumers of those services (features) should release their references to the service. This allows the provider of the service (feature) to be safely removed from the system.

If a feature interrogates the registry and does not find a required service, that feature may terminate or provide a reduced set of functionality. The feature may listen for registry changes. If the required services later become available, the feature may then execute properly and/or provide full functionality by resolving the service through the registry. This allows features to be safely installed and/or re-installed into the system.

Feature management may be performed manually, by an operator, or automatically, by executable application code, or both. An operator may retrieve the list of installed features from the application. The operator can then indicate, to the application, which features are to be stopped and/or made unavailable. The operator can further indicate that the feature is to be discarded by the application. The operator may then specify, to the application, the location of features that are to be loaded by the application. The operator interface may be provided via HTML web page, telnet console, or similar mechanisms. The skilled artisan will appreciate that Telnet is an internet protocol used for the purpose of providing remote access to a system. See the IETF's Telnet Protocol Specification RFC 854.

For automatic feature management, the application may monitor for feature revisions. If revisions are found, the application may stop the existing feature and un-load it. The application may then retrieve, load and start the appropriate revision. Note that revisions may be retrieved prior to disabling and un-loading existing features. This allows the revisions to be ready for use in a timely manner (downloaded in the background). Further, the application can determine a safe time for the feature to be replaced (such as when the feature is not in use).

A bundle is a code packaging system. Each bundle includes three basic things: (1) a manifest file, (2) an optional activator and (3) executable code and/or resources. Details regarding each of these bundle components are provided herein.

A bundle is deployed via the framework. The framework uses a deployment descriptor to identify which bundles are to be loaded, and how each bundle is to be loaded. Due to the numerous dependencies, NavigatorXlet is chosen to be the Framework. Exemplary details of its operation are provided herein.

The Bundle Manifest File

The bundle manifest file contains information about the bundle. This information can include run-time parameters, version information, and the like. Some notable properties of the manifest file include: specifying the system requirements, specifying the launch priority, and specifying the bundle activator.

System requirements are preferably located in the deployment descriptor so that loading does not occur if the requirements cannot be met.

The launch priority, 'Launch-Priority,' is a numeric value between 2 and 255, inclusive. This value indicates, to the framework, when the bundle is to be activated. If no activator is specified, this property has no effect.

The bundle activator is a special class, within the bundle, used to initialize the bundle. This class may be a javax.tv.xlet.Xlet or a com.twc.ocapx.bundling.BundleActivator. When the bundle is loaded, and the appropriate boot stage—relative to the launch priority—is reached, the NavigatorXlet and/or framework will resolve the bundle activator and invoke methods on it to activate the bundle.

The bundle activator is specified by listing the class name, along with its package, in the manifest file. This listing can be made by defining either the 'Main-Class' property or the 'Bundle-Activator' property.

The 'Main-Class' property is defined by JAVA (mark of ORACLE AMERICA, INC. REDWOOD SHORES CALIFORNIA 94065 USA) to make jar files executable. The 'Bundle-Activator' property is defined by OSGi.

FIG. 14 illustrates a bundle's manifest file. The example indicates that the class 'com.twc.ocapx.cpc.impl.CPCXlet' is the bundle activator. It also shows that the launch priority is '2.' Also shown, discussed elsewhere herein, is a listing of imported and exported packages.

Activator Life-Cycle Management

As described, a bundle activator can be a javax.tv.xlet.Xlet or a com.twc.ocapx.bundling.BundleActivator. The type will determine what methods are invoked when the bundle is activated. If the bundle activator implements both Xlet and BundleActivator, its Xlet methods will be invoked.

When the Bundle activator is of type javax.tv.xlet.Xlet, the NavigatorXlet/Framework first calls the class' initXlet method. This is immediately followed by a call to the class' startXlet method—assuming no errors are encountered.

When the Bundle activator is of type com.twc.ocapx.bundling.BundleActivator, the NavigatorXlet/Framework calls the start method of the class.

Whenever a Bundle needs to be stopped, the appropriate method is invoked based on the Bundle activator's type.

The NavigatorXlet/Framework will invoke the activator's destroyXlet method when the bundle is to be stopped, destroyed, and/or un-loaded and the activator is of type javax.tv.xlet.Xlet.

The NavigatorXlet/Framework will invoke the activator's stop method when the bundle is to be stopped, destroyed, and/or un-loaded and the activator is of type com.twc.ocapx.bundling.BundleActivator.

Activator Responsibilities

There are basically three forms that a Bundle can have: (1) library, (2) service or (3) an application. Of course, it is possible for a bundle to provide a mixture of the above forms.

Library

A bundle may provide a set of code that other applications use. In this case, no activator is required.

Service

A bundle may provide one or more services. In this case, the activator should register the services on start and un-register the services when the activator is stopped.

Service registration is supported by associating an object, derived from a class within the bundle, with a 'well known' name (typically the class name of the service). This association is made in the registry (com.twc.ocapx.Registry). Clients use the registry to resolve the object by its name.

The registry also supports a notification mechanism. Listeners are notified when services are added and/or removed from the registry. This notification mechanism allows for bundles to be dynamically loaded and unloaded. Clients are expected to discard references to resolved services when they are removed from the registry.

Application

A bundle may provide one or more applications. When the activator is invoked, the activator may start the applications. The activator is expected to stop all applications, which it started, when the activator is stopped.

Deployment Descriptor

The deployment descriptor is a file that contains a listing of all jar files that the NavigatorXlet/Framework is to load and activate.

In at least some embodiments, the deployment descriptor file is named 'jar.list' and is generated at build time. Each jar is listed, in the file, on a single line. It should be noted that the format of this file may change to accommodate conditional jar loading, based on system dependencies.

Thus, in one or more embodiments, a carousel 802 is used to provision applications down to set-top terminals 803. Currently, the applications are getting bigger and OCAP cannot send compressed applications to the terminals. One or more embodiments allow for getting around that limitation using a bundling technology.

Again, currently, the digital storage media command and control (DSM-CC) specification describes how to transfer data over the object carousel in a cable network. However, it does not provide any way to look into files that are carried on the carousel, and thus, there is no way to deliver compressed files representing code that is organized in some manner. One current scheme compresses the entire carousel but then the receiving device that receives from the carousel has to decompress the entire thing to obtain the files that are on the carousel. Currently, the receiving device (STB) also has to store some of the data because carousels can be slow to read from. Embodiments of the invention not only provide a system where code can be delivered in a compressed form, which takes up less bandwidth and therefore transfers faster, but also allow storage of the code on the STB in compressed form so that it takes up less physical memory.

One or more embodiments break the code into small compressed files and/or file systems, and deliver the compressed files onto the STB. The STB then stores the compressed files in their compressed format. To bridge the gap, some of the code, called the framework, remains uncompressed, and that is delivered on the carousel in an uncompressed form. Then, the framework is responsible for identifying all the compressed components that are on the carousel, loading them up, and interpreting the contents, i.e., decompressing them into memory and then executing the code properly. In essence, the system provides a way to reorganize code to overcome lack of capability on the DSM-CC object carousel 802.

Thus, in one or more embodiments, the framework is employed to collect the compressed components onto the box and coordinate them within a DSM-CC environment. One or more embodiments are used in cable and/or satellite system using a DSM-CC carousel.

Thus, in one or more embodiments, the link 805 between the carousel 802 and set-top terminal 803 can be a cable network or a satellite network.

In one or more embodiments, no changes are required to the carousel per se; rather, it is the content on the carousel that has changed. With regard to the frameworks that link to compressed pieces of code, a framework is a small kernel of decompressed code and the rest of the body of code is delivered in one or more compressed file systems.

In one or more embodiments, the STB itself has some code in it (resident code) that knows how to communicate with the carousel. It reads a file off the carousel that tells it what it should load and how it should execute the code that it finds on the carousel. The STB attaches to the carousel, reads this particular file, and now has to find and execute the framework piece. The framework piece also reads the carousel and finds each individual piece it is supposed to launch, loads them into memory, and executes them. Thus, the framework essentially takes over control of the STB.

In one or more instances, once the STB has downloaded the framework kernel, the framework takes over and reads the compressed files off the carousel, loads them into memory, and executes them. The framework kernel is software that runs on the STB. The framework takes control of the STB and obtains the compressed files from the carousel, downloads them, decompresses them, and executes them. The compressed files may include, for example, applications needed to run on the STB, or parts of applications, and also libraries.

In some instances, in systems where the applications, parts of applications, and/or libraries can be stored on the STB and are signaled to do so, the STB will store them and when the framework runs again it will read them from the appropriate location, either the internal storage or the carousel. That is to say, it is possible to have a system without local storage and obtain what is needed from the carousel whenever the STB boots, or it is possible to have local storage as described above.

Note that in one or more embodiments, the framework may load, or re-load, components from alternate sources, once installed.

In some cases, the framework stays on the STB and obtains the components from the carousel whenever the STB boots; in some cases, the framework and the components both reside on the STB and a check is made when the STB boots to see if anything new is needed and/or if there have been any changes; and in some cases, the framework and components are always obtained from the STB every time the STB boots.

By way of review and provision of additional detail, a bundle is a collection of executable code and/or resources. Typically, this is a highly cohesive set. A bundle does not have to be stand-alone. The bundle can depend on other bundles and services. A bundle is typically represented with a JAR file, is stored in compressed form, and is deployed and/or delivered in compressed form.

Figure 9:
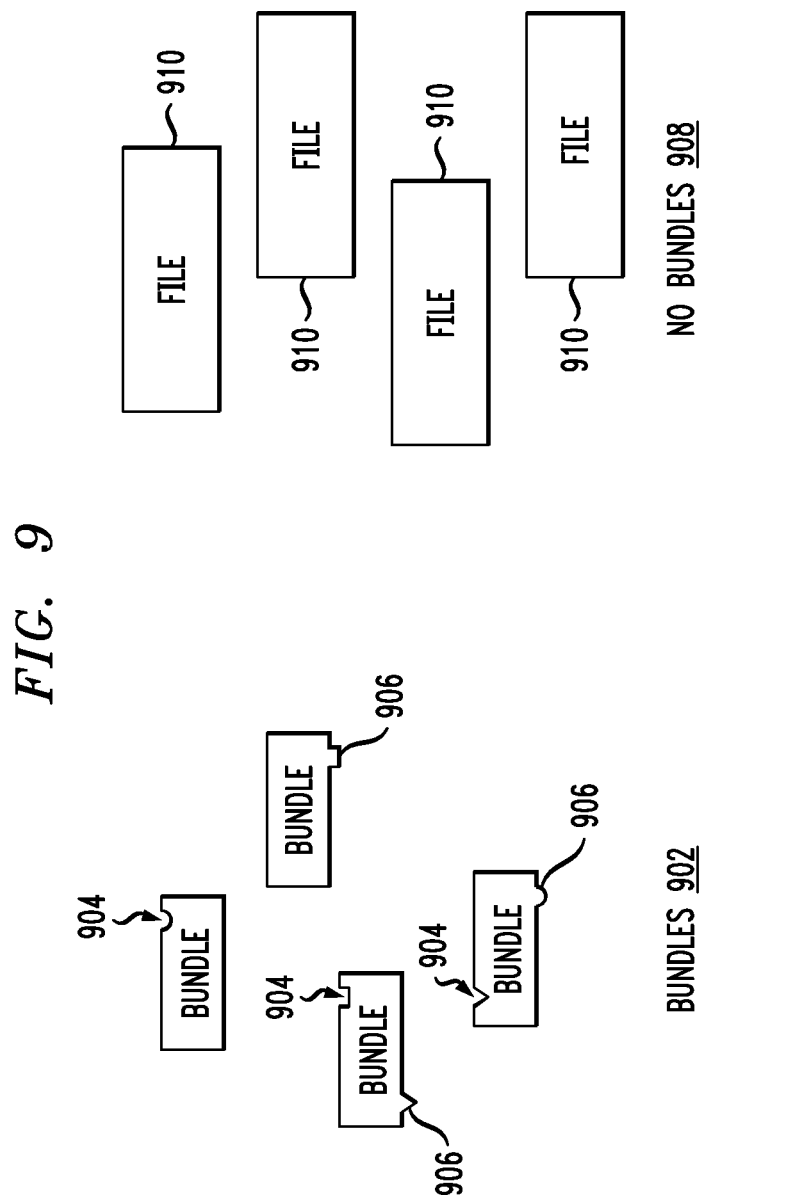
FIG. 9 illustrates aspects of bundling, according to an aspect of the invention.

Attention should now be given to FIG. 9. With regard to bundles 902, each trough 904 represents an export. Each ridge 906 represents an import and/or dependency. Bundles assist in managing sets of code. Dependencies become apparent and can be easily resolved. In some instances, resolution can be automated.

On the other hand, in the case 908 of no bundles, imports and exports are contained within individual files 910. Though it may appear that the modules can be organized in any arrangement, the dependencies may prohibit it. This solution requires manual effort to manage dependencies.

With regard to system dependencies, in one or more embodiments, since dependencies are described in the bundle, the framework and/or bundle loader can conditionally load bundles based on system resources. The framework can also use bundle information to conditionally load bundles based on billing, system properties, and so on.

It is advisable to avoid circular dependencies as they cause additional overhead. In at least some instances, use the registry to resolve circular dependencies (Mediator Pattern). The Mediator Pattern defines an object that encapsulates how a set of objects interact. Mediator promotes loose coupling by keeping objects from referring to each other explicitly, and it allows the programmer to vary their interaction independently. See Erich Gamma et al., Design Patterns: Elements of Reusable Object-Oriented Software, ISBN 0-201-63361-2, Addison-Wesley 1994, incorporated herein by reference in its entirety for all purposes.

With regard to the registry, the same is a similar concept as in the Microkernel architecture pattern. Pertinent concepts include the Common Object Request Broker Architecture (CORBA), which is a standard defined by the Object Management Group (OMG) that enables software components written in multiple computer languages and running on multiple computers to work together (i.e., it supports multiple platforms). The WINDOWS operating system is also pertinent in some instances. Reference is made to Pattern-Oriented Software Architecture by Frank Buschmann et al., published by Wiley, 1996, ISBN 0 471 95869 7, the complete disclosure of which is expressly incorporated herein by reference in its entirety for all purposes, and to Frank Buschmann and Kevlin Henney, Pattern-Oriented Software Architecture, OOP 2008, Jan. 21-25, 2008, Munich, Germany, ICM—International Congress Centre Munich, the complete disclosure of which is also expressly incorporated herein by reference in its entirety for all purposes. From such references, the skilled artisan will appreciate that the Microkernel architectural pattern applies to software systems that must be able to adapt to changing system requirements. It separates a minimal functional core from extended functionality and customer-specific parts. The microkernel also serves as a socket for plugging in these extensions and coordinating their collaboration.

In one or more embodiments, both the consumer and producer share an interface, not the implementation. The producer registers the implementation of the interface. The consumer resolves the interface by using the registry to acquire the registered implementation. In one or more embodiments, there is no IXC (inter-Xlet communication), no stub generation, and no DLL instance loading. This is more efficient because it does not require the operating system to be involved. Such embodiments also do not require translation of data in order to exchange the data between the producer and consumer.

With regard to dynamic registration, in some instances, with respect to removal of the producer, in at least some instances, the registry notifies consumers and the consumers discard their references. With respect to addition of the producer, in one or more instances, the registry notifies consumers, and the consumers resolve references. This allows for bundle management.

In one or more embodiments, class loaders allow the framework to dynamically load and un-load bundles. Discarding a class loader fully discards the classes and resources of the bundle. Class loaders allow the framework to resolve bundle dependencies dynamically.

With regard to classpath, in one or more instances, every ClassLoader has a single parent class loader. In one or more embodiments, the class loader can resolve in one or more parents. Every class loader preferably has a class path; e.g., with respect to files, URLs, and directories. The class path is the URL representing the source of the classes that reside (are defined) in the class loader. Typically, there is a static set of theses URLs that define the class path. One or more embodiments make it possible to dynamically and/or programmatically modify the class path associated with a class loader. With regard to class resolution, Java defines the process as follows:
1. Determine if the class is already loaded:
   1. See if it is loaded in the parent.
   2. See if it is loaded in the class loader.
2. If not loaded, try to resolve in the parent class loader.
3. If not in the parent, try to resolve in this class loader.

With regard to class resolution variation, in one or more embodiments, examine the exported packages. This will indicate whether the class resides in the current class loader, and/or reduce the time in attempting to load in the parent. In the case of a revision, determine if the class should reside in the current class loader. See if the class is already loaded—if resident, check the current class loader first; otherwise, check the parent first. If not loaded, if resident, load from the current class loader first. If it isn't resolved, then load from the parent. Otherwise, load from the parent. If it isn't resolved in the parent, attempt to load in the current class loader.

With regard to building a bundle, in its simplest form, the bundle is a JAR file. As such, an Ant entry, such as shown in FIG. 11, is sufficient. Tools are available that simplify this further. The following are eclipse plug-ins that will generate and deploy the jar file:
   The Eclipse plug-in development environment available from The Eclipse Foundation
   The Knopflerfish Eclipse Plug-in available from The Knopflerfish Project.

The above tools will also list exports and imports in the jar's manifest. This allows for better bundle management.

It is worth noting that the OCAP system uses IXC/Remote interfaces to produce client stubs. This requires that all IXC interfaces need to reside in the application class loader, unbundled. IXC (Inter-Xlet Communication) is a method of exchanging data between a producer and consumer where the producer and consumer are typically not executing within the same environment and thus are not able to otherwise communicate.

IXC is specific to OCAP. It causes the OCAP environment to generate Method stubs for the consumer. These stubs, when executed, translate the parameter data into a form that can be transferred to a remote producer. The OCAP environment then re-translates the transferred data to invoke a similar method provided by the producer. The results of executing the method, on the producer, are similarly translated, transferred, and decoded for the consumer.

Framework Extension

In one or more embodiments, bundles extend the run-time class path. Proposed standards can be integrated before release. Existing APIs can be mocked for testing. Emerging standards can be proven prior to submission. In at least some cases, services can be conditionally provided. Bundles may be dependent on hardware and conditionally loaded. Registration (discussed below) is used in at least some instances.

Dependency Substitution

In one or more instances, one API implementation can be substituted for another. Resolution occurs within the Class Loader. Classes are substituted during resolution. In at least some cases, the original API can be executed through mediation. The substituted API depends on the mediator which depends on the original API.

Figure 12:
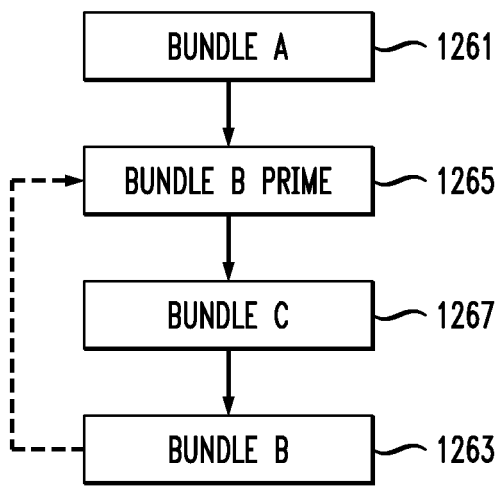
FIG. 12 shows exemplary dependency substitution, according to an aspect of the invention.

An example is presented in FIG. 12. Bundle A 1261 depends on interfaces exported by Bundle B 1263. Bundle Bprime 1265 provides the same interfaces as Bundle B 1263 and depends on bundle C 1267. Bundle C satisfies bundle Bprime's dependencies and may utilize Bundle B to do so. Bundle C thus controls Bundle A's use of Bundle B's interfaces.

This works because Bundle C resolves Bundle B's interface in Bundle Bprime. If Bprime was an OCAP API, and B was OCAP, then bundle C provides the OCAP API implementation and may use OCAP to do it (in whole or in part). The importance of this is threefold:
   This provides a way to customize the behavior (and access) to standard APIs.
   This allows for extension of the OCAP, and other, namespace(s). Additional functionality can be added and proved prior to specification submission. Further, the API can be provided in lieu of vendor specific implementations.
   This also allows for dependency injection, which can be valuable for in-system testing.

Security

In some instances, classes can be hidden or made inaccessible. The Class Loader implementation enforces access and/or resolution. Classes can be substituted, which allows for method access control and/or behavior modification; some instances require a mediator if original functionality is to be provided.

Dynamic Loading

Class loaders can be disposed; in one or more instances, this removes all class objects and files, prevents further resolution, and/or completely reclaims memory. In at least some instances, this requires indications of addition and/or removal. References should be released on removal. References can be restored on addition.

The Registry

In one or more embodiments, the registry provides notification of bundle addition and/or removal. This allows for dynamic loading. In an addition process, a bundle registers its classes, listeners are notified of the class registration, and listeners can resolve the classes for use. In a removal process, a bundle may un-register its classes, and listeners are notified of the removal and should discard their references.

Bundle Activation

Bundle activation provides a launch point for registration and/or de-registration. The BundleActivator is similar to OSGi, a modified API to allow for OCAP XletContext. Xlet allows for OCAP application integration.

Activator Life-cycles

With regard to Xlet, the Xlet is defined in the JAVA TV specification which is part of MHP and OCAP. Xlet life cycles are how applications are managed in the system. When an application is being loaded, whatever is doing the loading (in this case,
   OCAP) will call initXlet followed by startXlet. Then, if something happens, it will potentially call pauseXlet, and then destroyXlet is called when the application is no longer needed. The activator life cycle is what the framework does to decompress the components of the application. Refer to the outline below:
   initXlet
      Takes XletContext
      Xlet may register API
   startXlet
      Xlet may register API
   pauseXlet
      Threads should be stopped and exclusive locks released
   destroyXlet
      Xlet must un-register any services exported in the Registry.

With regard to Bundle Activator, the bundle activator is similar in concept to the Xlet in that it has states; a difference is that the bundle activator comes from the OSGi specification, which defines two methods for any kind of application; namely, start and stop. Refer to the OSGi Service Platform Core Specification Release 4, Version 4.2, June 2009, available from the OSGi Alliance, the complete disclosure of which is expressly incorporated herein by reference in its entirety for all purposes. One or more embodiments support both the OCAP and OSGi models. Refer to the outline below:

Start
    Revised to take XletContext
    Activator registers services with the Registry
Stop
    Activator must un-register any exported services.
Launch Descriptor File
    In one or more embodiments, this is a simple list of jar files. Each jar is examined. The manifest contains the entry point:
    Main-Class: specifies the class that is the bundle activator
    Import-Package: specifies dependencies
    Export-Package: specifies packages provided by the bundle.
    Launch-Order: specifies when the activator is invoked—
        "1" indicates launch prior to navigator start; otherwise, activator is launched after navigator start.

Figures 10, 11:
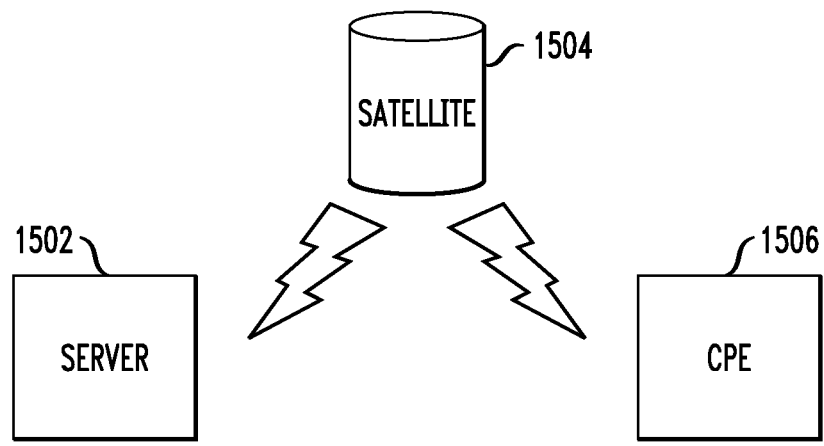
FIG. 10 is a block diagram of an exemplary system in the context of a satellite network, in accordance with an aspect of the invention.
FIG. 11 shows an exemplary Ant entry, according to an aspect of the invention.

Reference should be had to FIG. 10. As noted, while one or more embodiments have been shown in the context of a cable television network, other embodiments can be implemented in the context of satellite television, which is television programming delivered via a communications satellite 1504 and received by an outdoor antenna (conventional and omitted from FIG. 10 to avoid clutter), and as far as household usage is concerned, a satellite receiver such as CPE 1506. Server 1502 can include carousel functionality as described elsewhere herein. Note that in FIG. 10, the satellite link via satellite 1504 takes the place of HFC network 101. Material may be obtained at server 1502 from a variety of sources (i.e., the link to the CPE 1506 via satellite 1504 is distinct from the concept of obtaining program material in head end 150 via satellite, as shown at 1108 in FIG. 2).

Given the discussion thus far, it will be appreciated that, in general terms, an exemplary method, according to an aspect of the invention, includes the step of obtaining, at consumer premises equipment (a non-limiting example is set-top terminal 803), from a file system (a non-limiting example is digital storage media command and control (DSM-CC) object carousel 802; other examples are elements 798, 1602, and 1702), an indication that the consumer premises equipment needs to obtain at least one file from the file system. Another step includes, responsive to the consumer premises equipment obtaining the indication, obtaining, at the consumer premises equipment, from the file system, an uncompressed framework portion of the at least one file. A still further step includes executing the uncompressed framework portion of the at least one file on the consumer premises equipment. Executing the uncompressed framework portion in turn implements the steps of obtaining compressed portions of the at least one file at the consumer premises equipment, from the file system; and decompressing and executing the compressed portions of the at least one file on the consumer premises equipment.

As used in the claims, "consumer premises equipment" is intended to include traditional consumer premises equipment such as a set-top terminal 803, a "smart" television, a digital video recorder, a DOCSIS modem, a premises gateway, or the like; as well as non-traditional consumer premises equipment such as a "smart" cellular telephone or cellular-enabled tablet or laptop 1603, a "smart" internet protocol (IP) device, a personal computer 1703, or the like.

In some cases, in the step of obtaining the indication, the indication is obtained over a network such as a cable network 101 (preferably OCAP-compliant), satellite network (preferably MHP-complaint) as shown in FIG. 10; cellular network 1601 such as a 3G or 4G wireless network; IP network 1701, or the like. In such cases, the uncompressed framework portion is obtained from the file system over the network; and obtaining the compressed portions of the at least one file at the consumer premises equipment includes downloading the compressed portions of the at least one file over the network.

In one or more embodiments, the network is a video content network, such as a cable network or a satellite network; and the file system is a digital storage media command and control (DSM-CC) object carousel. In such cases, the indication and the uncompressed framework portion are obtained over the video content network, and the compressed portions of the at least one file are downloading over the video content network.

The skilled artisan will appreciate that a digital storage media command and control (DSM-CC) object carousel is a virtual file system that repeatedly delivers data in a continuous cycle; it allows data to be pushed from a broadcaster to multiple set-top box receivers by transmitting a data set repeatedly in a standard format; and it includes a file system directory structure comprising a root directory or service gateway and one or more files and directories. In a preferred embodiment, the digital storage media command and control (DSM-CC) object carousel complies with the DSM-CC specification in ISO standard ISO/IEC 13818-6:1998, expressly incorporated herein by reference in its entirety for all purposes, and any subsequent versions, amendments, and Corrigenda thereto, all of which are expressly incorporated herein by reference in their entireties for all purposes. The DSM-CC specification details how to transfer files and their structural information over an MPEG network. In some cases, the indication is detection of a change in an XAIT or AIT as defined by OCAP (typically in a user-to-user message; DSM-CC U-U protocol). The video content network is a cable network (including a "pure" cable network or an HFC network) or a satellite network.

As noted, a video content network and a DSM-CC object carousel are exemplary and non-limiting. Signaling and framework use can be implemented in a variety of contexts, such as IP-based systems, SMS cellular systems (SMS (Short Message Service) is a form of text messaging communication on phones and mobile phones) or virtual file systems such as NFS (Network File System (NFS) is a distributed file system protocol). A removable storage device can also be employed in some cases; that is to say, the file system is a thumb drive or external disk drive or the like (external to the STB or other CPE). Technicians can take dynamic code from the thumb or similar drive and load it on the box to run diagnostics. In this aspect, a thumb drive or the like is just another virtual file system. Insertion and removal of device results in signaling that can be used to trigger the loading of the framework software.

Returning again to FIG. 7, in some instances, processor 702 is coupled to an interface (e.g., a suitable port) to an external drive 798 such as a USB drive or ESATA drive (External Serial ATA (ESATA or External Serial Advanced Technology Attachment)). In some instances, in the step of obtaining the indication, the indication is obtained from a removable storage device 798 locally coupled to the consumer premises equipment. The indication could be, for example, part of the signaling generated upon inserting the device or its cable into the appropriate port. The uncompressed framework portion, in this approach, is also obtained from the removable storage device, as are the compressed portions of the at least one file (over the local coupling such as port and cable or the like).

Refer to FIG. 16. Some instances employ IP-based systems, including virtual file systems such as Network File System (NFS), which is a distributed file system protocol that allows a user on a client computer 1703 to access files (e.g., in file system 1702) over a network (e.g., IP network 1701) in a manner similar to how local storage is accessed. Thus, in some instances, the network is an internet protocol-based network 1701; the step of obtaining the indication includes obtaining the indication over the internet protocol-based network; the step of obtaining the uncompressed framework portion includes obtaining the uncompressed framework portion over the internet protocol-based network; and the compressed portions of the at least one file are downloaded to PC 1703 or other CPE over the internet protocol-based network. NFS is, in essence, like mounting a network drive on a PC.

Refer to FIG. 17. Short Message Service (SMS) is a text messaging service component of phone, web, or mobile communication systems, using standardized communications protocols that allow the exchange of short text messages between fixed line or mobile phone devices. Text messages can be entered into the system and routed via an IP network to an end device such as cellular phone or PC depending on how they get routed through the system. Some instances include updating files on a smart phone or 4G-connected laptop using SMS messaging. FIG. 15 shows a wireless device (could be, for example, a 3G or 4G smart phone but the example in FIG. 15 is a cellular-enabled laptop computer 1603) connected to a file system 1602 over a cellular network 1601. Accordingly, in some cases, the network is a cellular network; the step of obtaining the indication includes obtaining the indication over the cellular network; the step of obtaining the uncompressed framework portion includes obtaining the uncompressed framework portion over the cellular network; and the compressed portions of the at least one file are downloaded over the cellular network.

Thus, the same (or similar) signaling and framework can be obtained from Internet Protocol based systems, Short-Message-System (SMS) cellular systems, or virtual file systems (which are largely Internet Protocol based systems—like Network File System (NFS)). Additionally, the same (or similar) signaling and framework can be obtained via removable storage devices.

In some cases, an additional step includes storing the compressed portions of the at least one file in a persistent storage device 704 of the consumer premises equipment. The decompressing includes decompressing the compressed portions of the at least one file into a volatile memory unit 799 of the consumer premises equipment, only when needed to carry out the execution of the compressed portions of the at least one file on the consumer premises equipment.

In some instances, in the steps of obtaining the uncompressed framework portion of the at least one file and downloading the compressed portions of the at least one file, the at least one file is at least a portion of an application and/or at least a portion of a library.

In some embodiments, the obtaining of the indication, the obtaining of the uncompressed framework portion, and the executing of the uncompressed framework portion are carried out upon boot-up of the consumer premises equipment, and a further step includes repeating the obtaining of the indication, the obtaining of the uncompressed framework portion, and the executing of the uncompressed framework portion upon subsequent boot-ups of the consumer premises equipment.

In some embodiments, the obtaining of the indication, the obtaining of the uncompressed framework portion, and the executing of the uncompressed framework portion are carried out upon boot-up of the consumer premises equipment, and further steps include storing the uncompressed framework portion of the at least one file in a persistent storage device 704 of the consumer premises equipment, and, upon subsequent boot-ups of the consumer premises equipment, executing the uncompressed framework portion of the at least one file on the consumer premises equipment to: (i) download the compressed portions of the at least one file to the consumer premises equipment, over the video content network, from the digital storage media command and control (DSM-CC) object carousel; and (ii) decompress and execute the compressed portions of the at least one file on the consumer premises equipment.

In some embodiments, the obtaining of the indication, the obtaining of the uncompressed framework portion, and the executing of the uncompressed framework portion are carried out upon boot-up of the consumer premises equipment, and further steps include storing the uncompressed framework portion of the at least one file and the compressed portions of the at least one file in a persistent storage device of the consumer premises equipment, and, upon subsequent boot-ups of the consumer premises equipment, executing the uncompressed framework portion of the at least one file on the consumer premises equipment to decompress and execute the compressed portions of the at least one file on the consumer premises equipment.

In some instances, a further step includes executing the uncompressed framework portion of the at least one file on the consumer premises equipment to determine capabilities of the consumer premises equipment. In such cases, the compressed portions of the at least one file are selected in accordance with the determination of the capabilities.

In some cases, in the step of executing the uncompressed framework portion of the at least one file on the consumer premises equipment, the compressed portions of the at least one file that are downloaded are JAVA archive (JAR) files.

In some cases, a further step includes executing the uncompressed framework portion to obtain at least one additional portion of at least one additional file. See, for example, the discussion of BundleXlet elsewhere herein.

Figure 13:
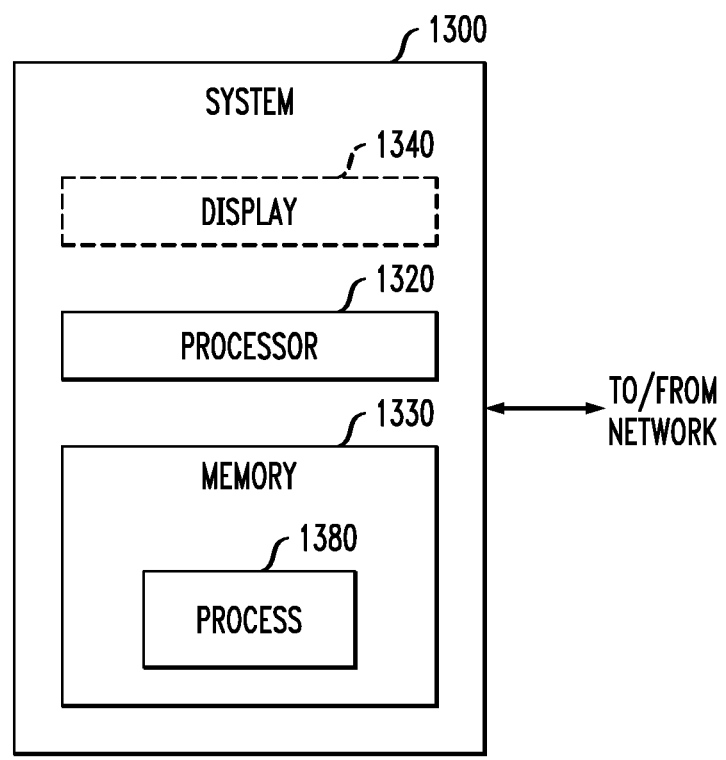
FIG. 13 is a block diagram of a computer system useful in connection with one or more aspects of the invention.

In another aspect, exemplary consumer premises equipment includes at least one hardware processor 702; and at least one memory coupled to the at least one hardware processor. The at least one hardware processor is operative to carry out or otherwise facilitate any one, some, or all of the method steps described herein. The memory could include, for example, a volatile memory such as RAM 799 and/or a persistent storage device 704. The processor could, for example, execute the distinct software modules described elsewhere herein. At least some instances of the consumer premises equipment can include a network interface such as 706 or as indicated by the "TO/FROM NETWORK" notation as shown in FIG. 13. The consumer premises equipment per se does not include the network or the file system, but is configured to interact with same.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

FIG. 13 is a block diagram of a system 1300 that can implement at least some aspects of the invention, and is representative, for example, of the servers shown in the figures. The processor, memory, and process are also representative of aspects of the functionality of set-top terminals, and the like. As shown in FIG. 13, memory 1330 configures the processor 1320 to implement one or more methods, steps, and functions (collectively, shown as process 1380 in FIG. 13) described herein. The memory 1330 could be distributed or local and the processor 1320 could be distributed or singular. Different steps could be carried out by different processors.

The memory 1330 could be implemented as an electrical, magnetic or optical memory, or any combination of these or other types of storage devices. It should be noted that if distributed processors are employed, each distributed processor that makes up processor 1320 generally contains its own addressable memory space. It should also be noted that some or all of computer system 1300 can be incorporated into an application-specific or general-use integrated circuit. For example, one or more method steps could be implemented in hardware in an ASIC rather than using firmware. Display 1340 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 1300 or processing capability on a firewall, intrusion prevention system, or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on the server 600, set-top terminal 106, 803, or the like, and that such program may be embodied on a tangible computer readable recordable storage medium. As used herein, including the claims, a "server" includes a physical data processing system (for example, system 1300 as shown in FIG. 13) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module which obtains the indication that the set-top terminal needs to obtain at least one file over the video content network from the carousel; a non-limiting example of such a module would be a (preferably OCAP-complaint) bootstrapper application 712. Also included are a second module that downloads and executes the framework; for example, once the change in the AIT or XAIT is detected; and a third module, the framework itself—the same may, for example, function as monitor application 708. The method steps can then be carried out using the distinct software modules of the system, as described above, executing on one or more hardware processors (e.g., a processor or processors in a server 600, processor such as 702 in set-top box 106, 803; processor 1320, and the like). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   obtaining, at consumer premises equipment, from a file system of a remote server, an indication that said consumer premises equipment needs to obtain at least one file from said file system;
   responsive to said consumer premises equipment obtaining said indication, obtaining, by said consumer premises equipment, from said file system, an uncompressed framework portion of said at least one file using an application locator of said file system for said uncompressed framework; and
   executing said uncompressed framework portion of said at least one file on said consumer premises equipment to:
      obtain compressed portions of said at least one file at said consumer premises equipment, from said file system; and
      decompress and execute said compressed portions of said at least one file on said consumer premises equipment,
   wherein said uncompressed framework portion is a kernel of code linking said compressed portions, that once decompressed, form a body of code, said kernel of code and said body of code forming an application executed by said consumer premises equipment.

2. The method of claim 1, wherein:
   in said step of obtaining said indication, said indication is obtained over a network;
   in said step of obtaining said uncompressed framework portion from said file system, said uncompressed framework portion is obtained from said file system over said network; and
   said obtaining of said compressed portions of said at least one file at said consumer premises equipment comprises downloading said compressed portions of said at least one file over said network.

3. The method of claim 2, wherein:
   said network comprises a video content network, said video content network in turn comprising one of a cable network and a satellite network;
   said file system comprises a digital storage media command and control (DSM-CC) object carousel;
   said step of obtaining said indication comprises obtaining said indication over said video content network;
   said step of obtaining said uncompressed framework portion comprises obtaining said uncompressed framework portion over said video content network; and
   said obtaining of said compressed portions of said at least one file at said consumer premises equipment comprises downloading said compressed portions of said at least one file over said video content network.

4. The method of claim 1, further comprising storing said compressed portions of said at least one file, obtained from said file system, in a persistent storage device of said consumer premises equipment, wherein said file system is stored on a server connected to said consumer premises equipment by a network, wherein said decompressing comprises decompressing said compressed portions of said at least one file into a volatile memory unit of said consumer premises equipment, upon said execution of said uncompressed framework portion of said at least one file on said consumer premises equipment, wherein said kernel of code selects said compressed portions of said at least one file, wherein said compressed portions selected by said kernel of code are loaded into said volatile memory unit of said consumer premises equipment and initialized by said kernel of code, said initialization comprising instantiating and executing classes identified in said compressed portions.

5. The method of claim 1, wherein, in said steps of obtaining said uncompressed framework portion of said at least one file and downloading said compressed portions of said at least one file, said at least one file comprises at least one of:
   at least a portion of an application; and
   at least a portion of a library.

6. The method of claim 1, wherein said obtaining of said indication, said obtaining of said uncompressed framework portion, and said executing of said uncompressed framework portion are carried out upon boot-up of said consumer premises equipment, further comprising repeating said obtaining of said indication, said obtaining of said uncompressed framework portion, and said executing of said uncompressed framework portion upon subsequent boot-ups of said consumer premises equipment.

7. The method of claim 3, wherein said obtaining of said indication, said obtaining of said uncompressed framework portion, and said executing of said uncompressed framework portion are carried out upon boot-up of said consumer premises equipment, further comprising:
   storing said uncompressed framework portion of said at least one file in a persistent storage device of said consumer premises equipment; and
   upon subsequent boot-ups of said consumer premises equipment, executing said uncompressed framework portion of said at least one file on said consumer premises equipment to:
      download said compressed portions of said at least one file to said consumer premises equipment, over said video content network, from said digital storage media command and control (DSM-CC) object carousel; and
      decompress and execute said compressed portions of said at least one file on said consumer premises equipment.

8. The method of claim 1, wherein said obtaining of said indication, said obtaining of said uncompressed framework portion, and said executing of said uncompressed framework portion are carried out upon boot-up of said consumer premises equipment, further comprising:
   storing said uncompressed framework portion of said at least one file and said compressed portions of said at least one file in a persistent storage device of said consumer premises equipment; and
   upon subsequent boot-ups of said consumer premises equipment, executing said uncompressed framework portion of said at least one file on said consumer premises equipment to decompress and execute said compressed portions of said at least one file on said consumer premises equipment.

9. The method of claim 1, further comprising executing said uncompressed framework portion of said at least one file on said consumer premises equipment to determine capabilities of said consumer premises equipment, wherein said compressed portions of said at least one file are selected in accordance with said determination of said capabilities.

10. The method of claim 1, wherein, in said step of executing said uncompressed framework portion of said at least one file on said consumer premises equipment, said compressed portions of said at least one file that are downloaded comprise JAVA archive (JAR) files.

11. The method of claim 1, further comprising executing said uncompressed framework portion to obtain at least one additional portion of at least one additional file.

12. The method of claim 1, wherein said obtaining of said indication comprises detecting a change in one of an extended application information table and an application information table.

13. The method of claim 3, wherein, in said step of obtaining said indication, said video content network comprises an OCAP-compliant cable network.

14. The method of claim 3, wherein, in said step of obtaining said indication, said video content network comprises an MHP-compliant satellite network.

15. The method of claim 2, wherein:
said network comprises an internet protocol-based network;
said step of obtaining said indication comprises obtaining said indication over said internet protocol-based network;
said step of obtaining said uncompressed framework portion comprises obtaining said uncompressed framework portion over said internet protocol-based network; and
said obtaining of said compressed portions of said at least one file at said consumer premises equipment comprises downloading said compressed portions of said at least one file over said internet protocol-based network.

16. The method of claim 2, wherein:
said network comprises a cellular network;
said step of obtaining said indication comprises obtaining said indication over said cellular network;
said step of obtaining said uncompressed framework portion comprises obtaining said uncompressed framework portion over said cellular network; and
said obtaining of said compressed portions of said at least one file at said consumer premises equipment comprises downloading said compressed portions of said at least one file over said cellular network.

17. The method of claim 1, further comprising providing a system, wherein the system comprises a plurality of distinct software modules, each of the distinct software modules being embodied in a non-transitory manner on a tangible computer-readable recordable storage medium, and wherein the distinct software modules comprise a first module, a second module, and a framework module, said framework module comprising said uncompressed framework portion;
wherein:
said obtaining of said indication is carried out by said first module executing on at least one hardware processor;
said obtaining of said uncompressed framework portion is carried out by said second module executing on said at least one hardware processor; and
said executing of said uncompressed framework portion is carried out by said second module executing said framework module on said at least one hardware processor.

18. The method of claim 1, wherein:
in said step of obtaining said indication, said indication is obtained from a removable storage device locally coupled to said consumer premises equipment;
in said step of obtaining said uncompressed framework portion, said uncompressed framework portion is obtained from said removable storage device; and
said obtaining of said compressed portions of said at least one file at said consumer premises equipment comprises obtaining said compressed portions of said at least one file from said removable storage device over said local coupling.

19. An apparatus comprising:
means for obtaining, at consumer premises equipment, from a file system of a remote server, an indication that said consumer premises equipment needs to obtain at least one file from said file system;
means, responsive to said consumer premises equipment obtaining said indication, for obtaining, by said consumer premises equipment, from said file system, an uncompressed framework portion of said at least one file using an application locator of said file system for said uncompressed framework; and
means for executing said uncompressed framework portion of said at least one file on said consumer premises equipment to:
obtain compressed portions of said at least one file at said consumer premises equipment, from said file system; and
decompress and execute said compressed portions of said at least one file on said consumer premises equipment,
wherein said uncompressed framework portion is a kernel of code linking said compressed portions, that once decompressed, form a body of code, said kernel of code and said body of code forming an application executed by said consumer premises equipment.

20. Consumer premises equipment comprising:
at least one hardware processor; and
at least one memory coupled to the at least one hardware processor, said at least one hardware processor being operative to:
obtain, at said consumer premises equipment, from a file system of a remote server, an indication that said consumer premises equipment needs to obtain at least one file from said file system;
responsive to said consumer premises equipment obtaining said indication, obtain, at said consumer premises equipment, from said file system, an uncompressed framework portion of said at least one file using an application locator of said file system for said uncompressed framework; and
execute said uncompressed framework portion of said at least one file on said consumer premises equipment to:
obtain compressed portions of said at least one file at said consumer premises equipment from said file system; and
decompress and execute said compressed portions of said at least one file on said consumer premises equipment,
wherein said uncompressed framework portion is a kernel of code linking said compressed portions, that once decompressed, form a body of code, said kernel of code and said body of code forming an application executed by said consumer premises equipment.

21. The consumer premises equipment of claim 20, further comprising a network interface coupled to said at least one hardware processor, wherein said at least one hardware processor is operative to:

obtain said indication from a network at said network interface;

obtain said uncompressed framework portion from the network at said network interface; and obtain said compressed portions of said at least one file by downloading said compressed portions of said at least one file over the network at said network interface.

22. The consumer premises equipment of claim 21, wherein:

said network interface comprises a video content network interface to a video content network, the video content network in turn comprising one of a cable network and a satellite network;

the file system comprises a digital storage media command and control (DSM-CC) object carousel; and said at least one hardware processor is operative to:

obtain said indication over the video content network at said video content network interface;

obtain said uncompressed framework portion over said video content network at said video content network interface; and obtain said compressed portions of said at least one file at said consumer premises equipment by downloading said compressed portions of said at least one file over the video content network at said video content network interface.

23. The consumer premises equipment of claim 20, wherein said memory comprises a persistent storage device and a volatile memory unit, wherein said at least one hardware processor is further operative to store said compressed portions of said at least one file, obtained from said file system, in said persistent storage device of said consumer premises equipment, wherein said file system is stored on a server connected to said consumer premises equipment by a network, and wherein said at least one hardware processor is operative to decompress said compressed portions of said at least one file into said volatile memory unit of said consumer premises equipment upon said execution of said uncompressed framework portion of said at least one file on said consumer premises equipment, wherein said kernel of code selects said compressed portions of said at least one file, wherein said compressed portions selected by said kernel of code are loaded into said volatile memory unit of said consumer premises equipment and initialized by said kernel of code, said initialization comprising instantiating and executing classes identified in said compressed portions.

24. The consumer premises equipment of claim 20, wherein said at least one file comprises at least one of:

at least a portion of an application; and at least a portion of a library.

25. The consumer premises equipment of claim 20, wherein said obtaining of said indication, said obtaining of said uncompressed framework portion, and said executing of said uncompressed framework portion are carried out upon boot-up of said consumer premises equipment, and wherein said at least one hardware processor is further operative to repeat said obtaining of said indication, said obtaining of said uncompressed framework portion, and said executing of said uncompressed framework portion upon subsequent boot-ups of said consumer premises equipment.

26. The consumer premises equipment of claim 20, wherein said memory comprises at least a persistent storage device, wherein said obtaining of said indication, said obtaining of said uncompressed framework portion, and said executing of said uncompressed framework portion are carried out upon boot-up of said consumer premises equipment, and wherein said at least one hardware processor is further operative to:

store said uncompressed framework portion of said at least one file in said persistent storage device of said consumer premises equipment; and upon subsequent boot-ups of said consumer premises equipment, execute said uncompressed framework portion of said at least one file on said consumer premises equipment to:

download said compressed portions of said at least one file to said consumer premises equipment, over the video content network at said video content network interface, from the digital storage media command and control (DSM-CC) object carousel; and decompress and execute said compressed portions of said at least one file on said consumer premises equipment.

27. The consumer premises equipment of claim 20, wherein said memory comprises at least a persistent storage device, wherein said obtaining of said indication, said obtaining of said uncompressed framework portion, and said executing of said uncompressed framework portion are carried out upon boot-up of said consumer premises equipment, and wherein said at least one hardware processor is further operative to:

store said uncompressed framework portion of said at least one file and said compressed portions of said at least one file in said persistent storage device of said consumer premises equipment; and upon subsequent boot-ups of said consumer premises equipment, execute said uncompressed framework portion of said at least one file on said consumer premises equipment to decompress and execute said compressed portions of said at least one file on said consumer premises equipment.

28. The consumer premises equipment of claim 20, wherein said at least one hardware processor is further operative to execute said uncompressed framework portion of said at least one file on said consumer premises equipment to determine capabilities of said consumer premises equipment, wherein said compressed portions of said at least one file are selected in accordance with said determination of said capabilities.

29. The consumer premises equipment of claim 20, wherein said compressed portions of said at least one file that are downloaded comprise JAVA archive (JAR) files.

30. The consumer premises equipment of claim 20, wherein said at least one hardware processor is further operative to execute said uncompressed framework portion to obtain at least one additional portion of at least one additional file.

31. The consumer premises equipment of claim 20, wherein said at least one hardware processor is operative to obtain said indication by detecting a change in one of an extended application information table and an application information table.

32. The consumer premises equipment of claim 20, further comprising a plurality of distinct software modules, embodied in a non-transitory manner on a tangible computer-readable recordable storage medium, wherein the distinct software modules comprise a first module, a second module, and a framework module, said framework module comprising said uncompressed framework portion;

wherein:

said at least one hardware processor is operative to obtain said indication by executing said first module;

said at least one hardware processor is operative to obtain said uncompressed framework by executing said second module; and said at least one hardware processor is operative to execute said uncompressed framework portion via said second module executing said framework module.

* * * * *